US 12,288,874 B2

(12) United States Patent
He et al.

(10) Patent No.: US 12,288,874 B2
(45) Date of Patent: Apr. 29, 2025

(54) SILICON-BASED COMPOSITE MATERIAL, LITHIUM ION BATTERY, AND PREPARATION METHOD THEREOF

(71) Applicant: BTR NEW MATERIAL GROUP CO., LTD., Shenzhen (CN)

(72) Inventors: Peng He, Shenzhen (CN); Chengmao Xiao, Shenzhen (CN); Jianguo Ren, Shenzhen (CN); Xueqin He, Shenzhen (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 600 days.

(21) Appl. No.: 17/623,429

(22) PCT Filed: Apr. 21, 2021

(86) PCT No.: PCT/CN2021/088785
§ 371 (c)(1),
(2) Date: Dec. 28, 2021

(87) PCT Pub. No.: WO2022/041799
PCT Pub. Date: Mar. 3, 2022

(65) Prior Publication Data
US 2022/0352509 A1 Nov. 3, 2022

(30) Foreign Application Priority Data
Aug. 31, 2020 (CN) .......................... 202010896660.8

(51) Int. Cl.
*H01M 4/38* (2006.01)
*H01M 4/02* (2006.01)
(Continued)

(52) U.S. Cl.
CPC ......... *H01M 4/386* (2013.01); *H01M 4/0471* (2013.01); *H01M 4/366* (2013.01);
(Continued)

(58) Field of Classification Search
CPC .... H01M 4/386; H01M 4/0471; H01M 4/625; H01M 2004/021; H01M 2004/027
See application file for complete search history.

(56) References Cited

U.S. PATENT DOCUMENTS

2007/0059452 A1* 3/2007 Debe ..................... H01M 4/925
427/372.2
2015/0064555 A1* 3/2015 Inoue ..................... H01M 4/38
429/219
(Continued)

FOREIGN PATENT DOCUMENTS

CN         1518144 A      8/2004
CN       103165874 A  *   6/2013
(Continued)

OTHER PUBLICATIONS

Machine Translation of CN109638269A (Jul. 23, 2024) (Year: 2024).*

(Continued)

Primary Examiner — Matthew J Merkling
(74) Attorney, Agent, or Firm — Tucker Ellis LLP

(57) ABSTRACT

The present disclosure relates to a porous nano-silicon-based composite material, an anode and a lithium ion battery and a preparation method thereof. The silicon-based composite material comprises nano active particles and graphite, and the nano active particles comprise porous nano-silicon; The graphite has a pore structure in which the nano active particles are embedded, and/or the graphite has a layered structure in which the nano active particles are embedded; Compared with the traditional carbon-coated silicon anode material, the silicon-based anode material prepared by the present disclosure has the advantage of lower expansion rate and thus improves cycle performance.

19 Claims, 7 Drawing Sheets

(51) Int. Cl.
  *H01M 4/04* (2006.01)
  *H01M 4/36* (2006.01)
  *H01M 4/62* (2006.01)
  *H01M 10/0525* (2010.01)

(52) U.S. Cl.
  CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2017/0162868 A1 | 6/2017 | Kim et al. | |
| 2018/0331356 A1* | 11/2018 | Feaver | H01M 4/366 |
| 2023/0317935 A1* | 10/2023 | Chen | H01M 4/364 |
| | | | 429/218.1 |

FOREIGN PATENT DOCUMENTS

| | | |
|---|---|---|
| CN | 103682287 A | 3/2014 |
| CN | 109638269 A | 4/2019 |
| CN | 110311120 A | 10/2019 |
| CN | 110400930 A | 11/2019 |
| CN | 110739455 A | 1/2020 |
| CN | 111092204 A | 5/2020 |
| CN | 111333063 A | 6/2020 |
| CN | 111348647 A | 6/2020 |
| JP | 3827642 B2 | 9/2006 |
| JP | 2013253012 A | 12/2013 |
| JP | 2014167901 A | 9/2014 |
| JP | 2015118911 A | 6/2015 |
| JP | 2019505948 A * | 2/2019 |
| WO | 2017031006 A1 | 2/2017 |

OTHER PUBLICATIONS

Machine Translation of CN110400930A (Jul. 23, 2024) (Year: 2024).*
Machine Translation of CN-103165874-A (Jul. 23, 24) (Year: 2024).*
Machine Translation of JP-2019505948-A (Dec. 3, 2024) (Year: 2024).*
Kohandehghan, A; "Magnesium and magnesium-silicide coated silicon nanowire composite anodes for lithium-ion batteries" Journal of Materials Chemistry A 2013(1) 1600-1612 (Year: 2013).*
Chinese Office Action from corresponding Application No. 202010896660.8 mailed on Dec. 1, 2023, 21 pages with translation.
Japanese Office Action from corresponding Application No. 2021-574340 mailed on Jan. 25, 2023, 9 pages with translation.
Japanese Decision to Grant Action from corresponding Application No. 2021-574340 mailed on Feb. 22, 2024, 5 pages with translation.
Korean Office Action from corresponding Application No. 10-2021-7041026 mailed on Jul. 13, 2024, 13 pages with translation.

* cited by examiner

SILICON-BASED COMPOSITE MATERIAL, LITHIUM ION BATTERY, AND PREPARATION METHOD THEREOF

CROSS-REFERENCE TO RELATED APPLICATIONS

This application claims the priority of Chinese patent application No. 202010896660.8 filed in China Patent Office on Aug. 31, 2020 and entitled "Silicon-based composite material, preparation method thereof and lithium ion battery", the entire contents of which are incorporated in this application by reference.

TECHNICAL FIELD

The present application relates to the field of anode materials for lithium ion batteries, and to a silicon-based composite material, an anode and a lithium ion battery and a preparation method thereof, in particular to a porous nano-silicon-based composite material, an anode and a lithium ion battery and a preparation method thereof.

BACKGROUND

Lithium ion batteries have become ideal portable batteries because of their high working voltage, light weight, small self-discharge, long cycle life, no memory effect, no environmental pollution and good safety performance. Si has a high lithium intercalation capacity, which is up to 4200 mAh·g$^{-1}$, but there is a serious volume expansion effect in the anode of silicon, which leads to poor cycle performance and rapid degradation of the material, which cannot meet the requirements of long cycle and low expansion, thus hindering Si from being used in practical applications as the anode of lithium ion batteries.

In the modification methods of the anode material, there are still some problems, such as the rapid degradation of silicon anode material in the initial stage, which indicates that the modification methods are still deficient in improving the cycle performance and controlling the volume expansion of the material; and the prepared silicon-based composite material has a low capacity and cannot meet the demand of high capacity; in addition, there are still some problems, such as high expansion rate and rapid degradation in a long cycle.

Therefore, developing a silicon-based composite material with an ultra-low expansion rate and excellent cycle performance is a technical problem in the field of lithium ion battery.

SUMMARY

In view of this, the present disclosure provides a silicon-based composite material, which includes nano active particles and graphite, wherein the nano active particles include porous nano-silicon;

the graphite has a pore structure in which the nano active particles are embedded, and/or, the graphite has a layered structure in which the nano active particles are embedded.

In some embodiments, a mass ratio of the nano active particles to the graphite is (0.5-80):(10-50).

In some embodiments, a median particle size of the silicon-based composite material is 1 μm-40 μm.

In some embodiments, a specific surface area of the silicon-based composite material is 1 m$^2$/g-20 m$^2$/g.

In some embodiments, a carbon coating is formed on a surface of the silicon-based composite material.

In some embodiments, a median particle size of the porous nano-silicon is 1 nm-500 nm.

In some embodiments, a specific surface area of the porous nano-silicon is 1 m$^2$/g-500 m$^2$/g.

In some embodiments, a porosity of the porous nano-silicon is 20%-90%.

In some embodiments, a pore diameter of the porous nano-silicon is 1 nm-0.1 μm.

In some embodiments, the nano active particles further comprise a magnesium silicide layer formed on the surface of the porous nano-silicon.

In some embodiments, a thickness of the magnesium silicide layer is 1 nm-100 nm.

In some embodiments, a mass fraction of the magnesium silicide layer is 0.5%-10% based on 100% by mass of the nano active particles.

In some embodiments, the graphite includes at least one of porous graphite and flake graphite.

In some embodiments, a median particle size of the graphite is 1 μm-10 μm.

In some embodiments, a ratio of the median particle size of the graphite to that of the porous nano-silicon is (10-40):1.

In some embodiments, a porosity of the porous graphite is 10%-50%.

In some embodiments, a pore diameter of the porous graphite is 10%-50% larger than the median particle size of the porous nano-silica.

In some embodiments, a layer-to-layer spacing of the flake graphite is 10 nm to 500 nm.

In some embodiments, a ratio of length:width:thickness of the flake graphite is (2-20):(0.4-3):(0.1-0.2).

The present disclosure provides a method for preparing a silicon-based composite material including the following steps:

mixing nano active particles and graphite in an organic solvent so that the nano active particles are embedded in the interlayers and/or pores of the graphite to obtain a slurry, and obtaining the silicon-based composite material after drying, wherein the nano active particles include porous nano-silicon.

In some embodiments, a preparation method of the porous nano-silicon includes etching a silicon alloy to obtain the porous nano-silicon.

In some embodiments, the silicon alloy includes at least one of aluminum-silicon alloy, iron-silicon alloy and silicon-zinc alloy.

In some embodiments, the silicon alloy is submicron particles.

In some embodiments, an etchant used for the etching includes at least one of hydrochloric acid, hydrofluoric acid, sulfuric acid and phosphoric acid.

In some embodiments, a time for the etching is 0 h-7 h and exclusive of 0.

In some embodiments, a mass ratio of the porous nano-silicon to the graphite is (0.5-80):(10-50).

In some embodiments, the organic solvent includes, but not limited to, at least one of aromatic hydrocarbon, chlorinated hydrocarbon, alcohol ether, amine compound, ketone or alcohol, and an example of the alcohol can be at least one of R—OH where R is C1-C11 alkyl.

In some embodiments, the organic solvent includes at least one of methanol, ethanol, propanol, isopropanol, butanol, pentanol, acetone, toluene, styrene, perchloroethylene, trichloroethylene, ethylene glycol ether and triethanolamine.

In some embodiments, a method for preparing the slurry further includes: mixing the nano active particles, a dispersant and the graphite in the organic solvent to obtain a slurry.

In some embodiments, the dispersant includes, but not limited to, at least one surfactant containing carboxyl, sulfonic acid group or amino group.

In some embodiments, the dispersant includes, but not limited to, at least one of n-octadecanoic acid, epoxy resin, lauric acid, polyacrylic acid, sodium dodecyl benzene sulfonate, n-eicosanoic acid, polyvinyl chloride and polyvinylpyrrolidone.

In some embodiments, a method for the drying includes at least one of vacuum drying, spray drying and rotary evaporation.

In some embodiments, the preparation process of the silicon-based composite material further includes preforming carbon coating on the dried product.

In some embodiments, a method of the carbon coating includes: mixing the dried product with a carbon source, and sintering to obtain the silicon-based composite material.

In some embodiments, the carbon source includes at least one of carbohydrates, resins, organic acids, polyols, enols, or a mixture of graphitizable carbon materials.

In some embodiments, the carbon source includes at least one of epoxy resin, citric acid, sucrose, glucose, asphalt, phenolic resin, fructose, polyethylene glycol, polyvinyl alcohol and polyvinyl chloride.

In some embodiments, a temperature for the sintering is 500° C.-1500° C. and a time for the sintering is 1 h-12 h.

In some embodiments, the temperature for the sintering is 800° C.-1200° C. and the time for the sintering is 3 h-10 h.

In some embodiments, after the sintering, the method further includes pulverizing, sieving and demagnetizing the sintered product to obtain the silicon-based composite material.

In some embodiments, the preparation process of the porous nano-silicon further includes: forming a magnesium silicide layer on a surface of the porous nano-silicon.

In some embodiments, a preparation method for forming the magnesium silicide layer includes: performing a surface plating treatment on the porous nano-silicon to obtain the porous nano-silicon on a surface of which the magnesium silicide layer is formed.

In some embodiments, a method for the surface plating treatment includes at least one of magnetron sputtering and vacuum plating.

In some embodiments, the method for preparing the silicon-based composite material includes the following steps:

etching the silicon alloy to obtain the porous nano-silicon, wherein the silicon alloy is submicron particles;

performing surface plating treatment on the porous nano-silicon to obtain the porous nano-silicon on a surface of which the magnesium silicide layer is formed;

mixing the porous nano-silicon on a surface of which the magnesium silicide layer is formed, the organic solvent, the dispersant and the graphite to obtain a slurry, and drying to obtain a precursor, wherein the mass ratio of the porous nano-silicon to the graphite is (0.5-80):(10-50); and mixing the precursor with the carbon source and sintering to obtain the silicon-based composite material.

The present disclosure provides an anode including the silicon-based composite material.

The present disclosure provides a lithium ion battery including the silicon-based composite material.

BRIEF DESCRIPTION OF DRAWINGS

In order to explain the technical solution of the embodiments of this disclosure more clearly, the following drawings will be briefly introduced. It should be understood that the following drawings only represent the embodiments of this disclosure by way of example, and the scale in the drawings does not directly correspond to the real scale of the embodiments. Meanwhile, the following drawings only show some embodiments of this disclosure, so they should not be regarded as limiting the scope. Other related figures can also be derived from these figures without an inventive step for a person of ordinary skill in the art.

Reference signs: 100—silicon-based composite material; 120—porous nano-silicon; 122—magnesium silicide layer; 140—porous graphite; 142—pore structure; 160—flake graphite; 162—layered structure; 180—carbon coating; 200—battery; 220—cathode; 240—anode; 242—anode current collector; 244—anode active material layer; 260—electrolyte; 280—separator; 290—case

DESCRIPTION OF EMBODIMENTS

The technical solution of the present disclosure will be further illustrated below with reference to the attached drawings and examples.

In order to make the purpose, technical solution and advantages of this disclosure clearer, this disclosure will be further explained below in detail with reference to the drawings and examples. It should be understood that the embodiments described herein are only for explaining the present disclosure, and are not intended to limit the present disclosure. In addition, the technical features involved in each embodiment of the disclosure described below can be combined with each other as long as they do not conflict with each other. Without departing from the principles of the embodiments of the present disclosure, several improvements and embellishments can be made, and these improvements and embellishments are also regarded as the protection scope of the embodiments of the present disclosure.

An embodiment provides a silicon-based composite material, which is used for solving the problems of a high expansion rate of silicon-based anode material and a low expansion rate of polar plate in the prior art, thus provides a silicon-based composite material with a low expansion rate and excellent cycle performance, an anode and a lithium ion battery and a preparation method thereof. Another embodiment provides a preparation method of the above silicon-based composite material. Yet another embodiment provides a lithium ion battery including the silicon-based composite material.

I. Silicon-Based Composite Material

Figure 10:
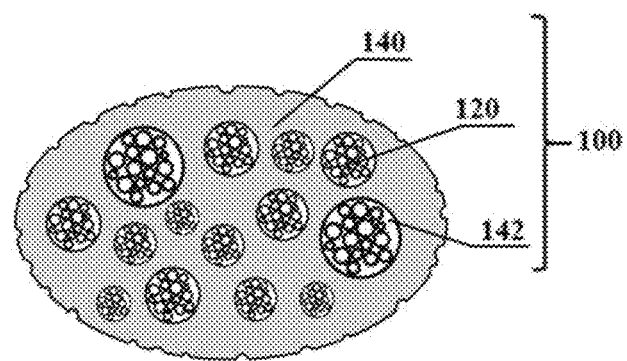
FIG. 10 is a schematic cross-sectional structure diagram of a silicon-based composite material provided by some embodiments of the present disclosure.
Figure 11:
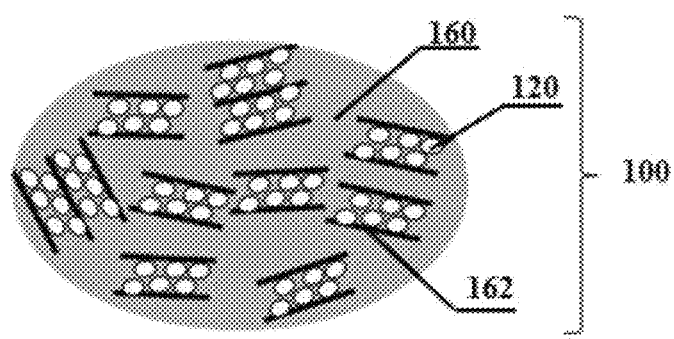
FIG. 11 is a schematic cross-sectional structure diagram of a silicon-based composite material provided by some embodiments of the present disclosure.
Figure 15:
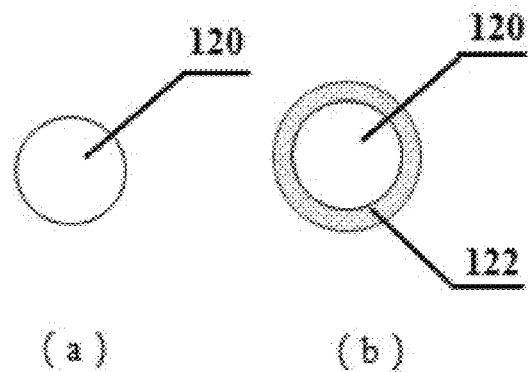
FIG. 15 is a schematic cross-sectional structure diagram of porous nano-silicon of some embodiments of the present disclosure, in which (a) is porous nano-silicon without a magnesium silicide layer coating, and (b) is porous nano-silicon coated with a magnesium silicide layer.

As shown in FIGS. 10 and 11 and FIG. 15(a), in one embodiment, the silicon-based composite material 100 includes nano active particles and graphite; the graphite has a pore structure 142 in which nano active particles are embedded, and/or the graphite has a layered structure 162 in which nano active particles are embedded; the nano active particles include porous nano-silicon 120.

In the silicon-based composite material 100, the nano active particles containing porous nano-silicon 120 form an embedded structure with the graphite, and the porous nano-silicon 120 is embedded in the interlayer of the graphite (i.e., the layered structure 162) and/or the pore structure 142 of the graphite. It has the following advantages: because of the existence of internal pores, the porous nano-silicon 120 provides expansion space for the volume expansion of silicon, so it has a lower expansion rate; meanwhile, the porous nano-silicon 120 is embedded in the interlayer and/or the pore structure 142 of the graphite, and the space between the layers and/or the pores provides sufficient expansion space for the expansion of the porous nano-silicon 120, and the bonded action of the two makes the expansion of the silicon-based composite material 100 of the present disclosure be further controlled, thereby obtaining silicon-based composite material 100 with ultra-low expansion and improving the cycle performance.

In some embodiments, in the silicon-based composite material 100, the mass ratio of the nano active particles to the graphite is (0.5-80):(10-50), including but not limited to 0.5:10, 0.5:20, 0.5:35, 0.5:45, 0.5:50, 1:45, 5:40, 10:35, 20:30, 40:25, 60:20, 70:15, 80:10, 80:20, 80:35, 80:45, or 80:50, etc. The mass ratio in the above range not only makes the nano active particles uniformly distributed in the layered structure 162 and/or the pore structure 142 of the graphite, but also improves the overall performance of the anode material and the battery 200. However, if the proportion of the nano active particles is too large, the nano active particles are difficult to distribute uniformly, and there will be nano active particles exposed outside of the graphite. If the proportion of the nano active particles is too less, there will be too few active substances, which will reduce the overall performance of the anode material and the battery 200.

In some embodiments, the median particle size of the silicon-based composite material 100 is 1 μm to 40 μm, or 5 μm to 20 μm, including but not limited to 1 μm, 2 μm, 5 μm, 10 μm, 15 μm, 20 μm, 25 μm, 30 μm, 35 μm or 40 μm, etc. The above median particle size range will not only reduce the expansion probability of silicon volume, but also have a low industrial cost, and will not consume more irreversible lithium in the process of SEI film formation, thus improving the initial coulombic efficiency. However, if the median particle size of the silicon-based composite material 100 is too large, the number and size of large particles in the particle size distribution of the composite material in the product will increase, resulting in higher volume expansion of silicon. If the particle size is too small, implementation will be difficult and the industrialization cost will be high. At the same time, the specific surface area of the product will be larger, and more irreversible lithium will be consumed in the SEI film formation process, resulting in decrease of the initial efficiency.

Figure 12:
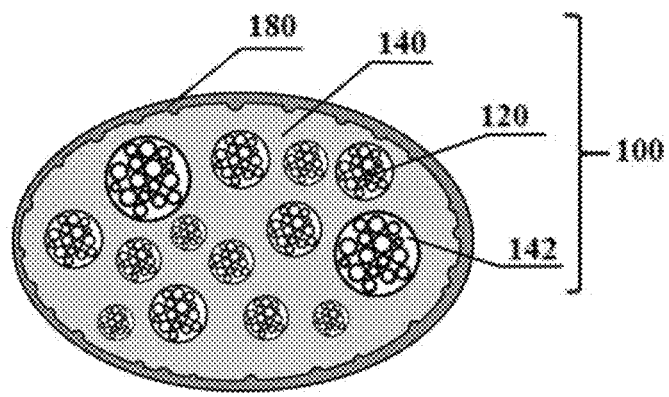
FIG. 12 is a schematic cross-sectional structure diagram of a silicon-based composite material provided by some embodiments of the present disclosure.
Figure 13:
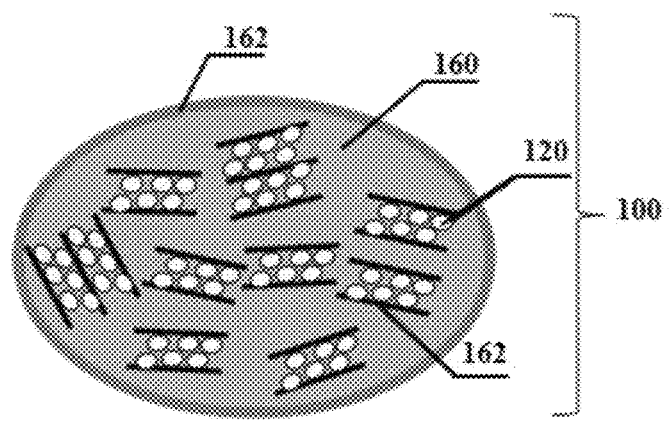
FIG. 13 is a schematic cross-sectional structure diagram of a silicon-based composite material provided by some embodiments of the present disclosure.

In some embodiments, the specific surface area of the silicon-based composite material 100 is 1 $m^2/g$ to 20 $m^2/g$, or 1 $m^2/g$ to 10 $m^2/g$, including but not limited to 1 $m^2/g$, 2 $m^2/g$, 5 $m^2/g$, 8 $m^2/g$, 10 $m^2/g$, 12 $m^2/g$, 15 $m^2/g$, 18 $m^2/g$ or 20 $m^2/g$, etc. As shown in FIGS. 12 and 13, in some embodiments, a carbon coating 180 is formed on the surface of the silicon-based composite material 100. By coating silicon-based composites with carbon, the conductivity of the materials can be further improved and the electronic conduction resistance between particles can be reduced.

(A) Porous Nano-Silicon

In some embodiments, the median particle size of the porous nano-silicon 120 is 1 nm-500 nm, 5 nm-250 nm or 50 nm-200 nm, including but not limited to 1 nm, 10 nm, 20 nm, 50 nm, 100 nm, 150 nm, 200 nm, 250 nm, 300 nm, 350 nm, 400 nm, 450 nm or 500 nm, etc. The median particle size in the above range not only improves the coating and granulation efficiency, but also makes the particles not easy to be oxidized. However, if the median particle size is too small, the particles will be easily oxidized and the technical implementation will be difficult. If the median particle size is too large, it will be difficult to implement coating and granulation. In some embodiments, the specific surface area of the porous nano-silicon 120 is 1 $m^2/g$-500 $m^2/g$, 10 $m^2/g$-400 $m^2/g$ or 20 $m^2/g$-400 $m^2/g$, including but not limited to 1 $m^2/g$, 5 $m^2/g$, 10 $m^2/g$, 30 $m^2/g$, 50 $m^2/g$, 100 $m^2/g$, 150 $m^2/g$, 200 $m^2/g$, 250 $m^2/g$, 300 $m^2/g$, 350 $m^2/g$, 400 $m^2/g$, 450 $m^2/g$ or 500 $m^2/g$, etc. Within the above specific surface area range, the specific surface area increases, which provides more contact points between lithium ions and silicon, which is more conducive to the smooth insertion and removal of lithium ions, thereby improving the rate performance of the material.

In some embodiments, the porosity of porous nano-silicon 120 is 20%-90%, 20%-80%, 40%-80%, including but not limited to 20%, 30%, 40%, 50%, 60%, 70%, 80% or 90%, etc. Within the above porosity range, the irreversible capacity will not be increased, thus the initial reversible capacity is improved, and the volumetric energy density is also improved, so that the initial coulombic efficiency and cycle efficiency of the electrode are improved. However, if the porosity is too large, the specific surface area of porous nano-silicon 120 will be larger, which will consume more lithium in the process of SEI film formation and increase the irreversible capacity, thus reducing the initial coulombic efficiency and tapped density, which is not conducive to improving the volumetric energy density. In addition, if the porosity is too small, there will not be enough space to buffer the expansion of nano-silicon, and the particles will be pulverized, resulting in poor cycles.

Figure 14:
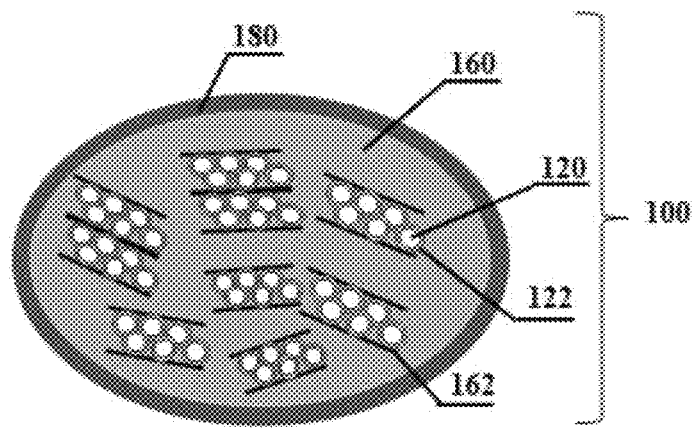
FIG. 14 is a schematic cross-sectional structure diagram of a silicon-based composite material provided by some embodiments of the present disclosure.

In some embodiments, the pore diameter of the porous nano-silicon 120 is 1 nm to 0.1 µm, including but not limited to 1 nm, 5 nm, 10 nm, 20 nm, 30 nm, 40 nm, 50 nm, 60 nm, 70 nm, 80 nm, 90 nm or 0.1 µm, etc. As shown in FIGS. 14 and 15(b), in some embodiments, the nano active particles further include a magnesium silicide layer 122 formed on the surface of the porous nano-silicon 120.

In some embodiments, the magnesium silicide layer 122 exists on the outer surface of porous nano-silicon 120 particles. In at least one embodiment, the magnesium silicide layer 122 exists not only on the outer surface of porous nano-silicon 120, but also on the inner surface of pores of porous nano-silicon 120.

In the above embodiment, the magnesium silicide layer 122 is formed on the surface of the porous nano-silicon 120, and the porous nano-silicon 120 coated with the magnesium silicide layer 122 is embedded in the interlayer and/or pores of the graphite, which can solve the problems that the outer coating layer of the embedded structure is not dense and the electrolyte 260 will soak into contact with silicon during the reaction, resulting in a unstable interface in the related art. Without being bound by theory, when the electrolyte 260 is directly contact with the porous nano-silicon 120 (which is not coated by the magnesium silicide layer 122), the SEI film will be unstable, resulting in a decrease in cycle times and coulombic efficiency of the battery 200. In the embodiment of the present disclosure, the surface of porous nano-silicon 120 is modified by depositing magnesium silicide layer 122 and utilizing magnesium silicide to improve the contact with electrolyte 260, thereby improving the coulombic efficiency in the cycle process and improving the cycle performance.

It can be understood that the magnesium silicide layer 122 on the surface of the porous nano-silicon 120 improves the contact effect between the porous nano-silicon 120 and the electrolyte 260, reduces the generation of $Li_2CO_3$ during charging and discharging, ensures that the generated SEI film is more stable, and reduces the consumption of irreversible lithium ions, thereby improving the cycle coulombic efficiency and cycle performance. At the same time, porous nano-silicon 120 has pores itself, which can be used to alleviate its own expansion, thus effectively reducing the volume expansion rate of the silicon-based material. In addition, the lithium intercalation potential of the magnesium silicide coated on the surface is different from that of silicon, so they can serve as buffer layers for each other, further reducing the volume expansion effect of silicon, and thus obtaining an ultra-low expansion effect.

In some embodiments, the thickness of the magnesium silicide layer 122 is 1 nm to 100 nm, including but not limited to 5 nm, 10 nm, 20 nm, 30 nm, 40 nm, 50 nm, 60 nm, 70 nm, 80 nm or 90 nm, etc. The magnesium silicide layer within the above thickness range can effectively bond magnesium silicide with porous nano-silicon 120 and improve its protective performance. If the magnesium silicide layer 122 is too thick, the bonding between magnesium silicide and porous nano-silicon 120 will be poor, while if the magnesium silicide layer 122 is too thin, its protective effect will be weak.

In some embodiments, the mass fraction of the magnesium silicide layer 122 is 0.5%-10%, including but not limited to 0.5%, 1%, 3%, 5%, 7%, 9%, or 10%, etc., based on 100% by mass of the nano active particles.

(B) Graphite

In some embodiments, the graphite includes at least one of porous graphite 140 or flake graphite 160.

It should be noted that the above porous graphite 140 means that graphite has certain pores inside. In some embodiments, porous graphite 140 is obtained by performing pore-forming on natural graphite or artificial graphite. The above flake graphite 160 refers to graphite having a lamellar structure, for example, the ratio of its thickness to its length in the long axis direction is >2.5.

In some embodiments, the median particle size of the graphite is 1 µm-10 µm, 3 µm-9 µm, or 4 µm-7 µm, including but not limited to 2 µm, 3 µm, 4 µm, 5 µm, 6 µm, 7 µm, 8 µm or 9 µm, etc.

In the above embodiment, the graphite with the above particle size is adopted, and the porous nano-silicon 120 is embedded in the pore structure 142 of the graphite. Compared with the embedded structure formed by two-dimensional materials and silicon, the carbon coating 180 formed on the surface is more dense, which is conducive to avoiding the contact between the electrolyte 260 and silicon and improving the interface stability.

In some embodiments, the ratio of the median particle size of the graphite to that of the porous nano-silicon 120 is (10-40):1, including but not limited to 10:1, 15:1, 20:1, 25:1, 30:1, 35:1 or 40:1, etc.

In some embodiments, the porosity of the porous graphite 140 is 10%-50%, 15%-40%, or 25%-35%, including but not limited to 15%, 20%, 25%, 30%, 35%, 40% or 45%, etc. Within the above porosity range, the effective filling amount of nano-silicon can be satisfied, so that the initial reversible capacity, the initial coulombic efficiency, and the retention rate of circulating capacity can be improved, and the expansion rate can be reduced.

In some embodiments, the pore diameter of the porous graphite 140 is greater than the median particle size of the porous nano-silicon 120 by 10%-50%, 15%-40%, or 25%-35%, including but not limited to 15%, 20%, 25%, 30%, 35%, 40% or 45%, etc. The pore diameter of the porous graphite 140 is an average pore diameter.

In the above embodiment, the porous graphite 140 is used as the graphite, and the pore size of the porous graphite 140 is controlled to be larger than the particle size of the porous nano-silicon 120 by 10%-50%, which is beneficial for the porous nano-silicon 120 to enter and be stored in the pores of the porous graphite 140, and limits the expansion of silicon, thus obtaining silicon-based composite material 100 with ultra-low expansion, and further improving the cycle performance of the lithium ion battery 200.

In some embodiments, the layer-to-layer spacing of flake graphite 160 is 10 nm to 500 nm, including but not limited to 10 nm, 20 nm, 50 nm, 100 nm, 150 nm, 200 nm, 250 nm, 300 nm, 350 nm, 400 nm, 450 nm or 500 nm, etc.

In some embodiments, the ratio of length:width:thickness of flake graphite 160 is (2-20):(0.4-3):(0.1-0.2), including but not limited to 20:3:0.2, 15:2:0.1, 10:1:0.1, 5:2:0.1, 5:0.4:0.1 or 2:0.4:0.15, etc.

II. Preparation of a Silicon-Based Composite Material

Figure 1:
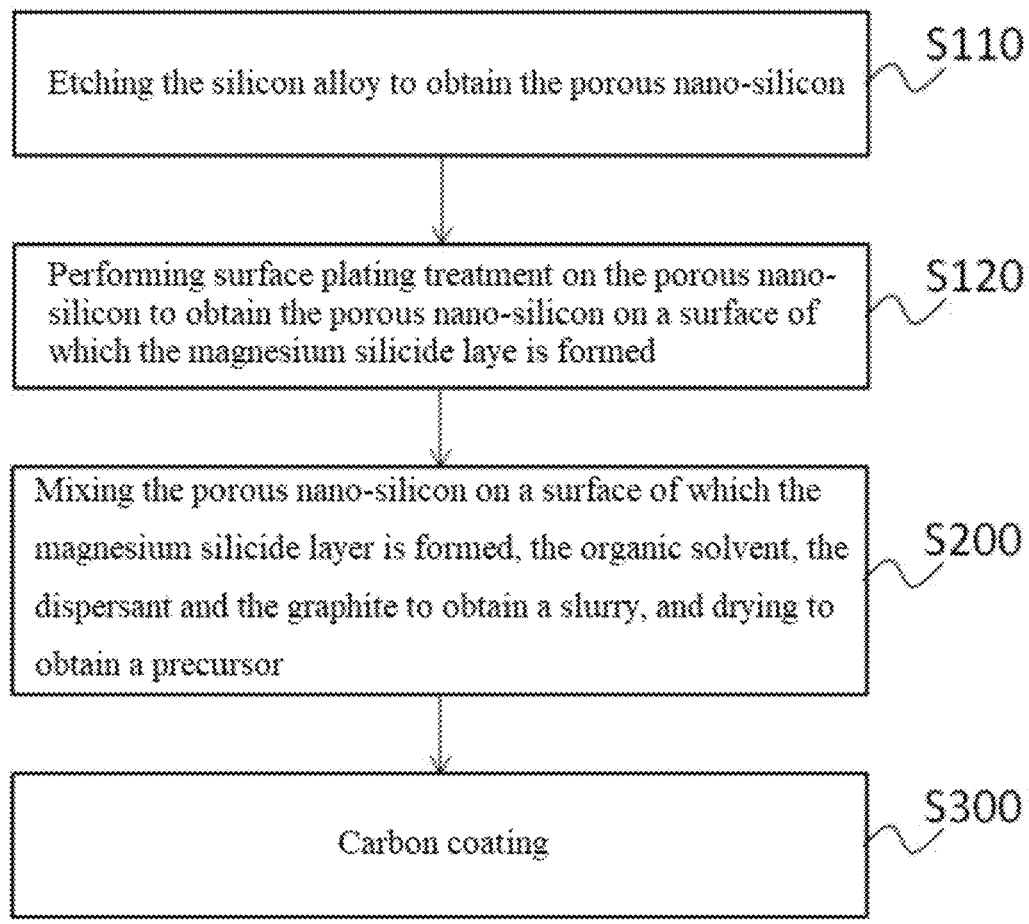
FIG. 1 is a schematic flow chart of a preparation process of the silicon-based composite material in an embodiment of the present disclosure.

The preparation method of the silicon-based composite material 100 includes steps S100-S300, and its flow diagram is shown in FIG. 1.

S100: Preparing Nano Active Particles.

In some embodiments, preparing nano active particles includes steps S110 and S120.

In step S110, etching a silicon alloy to obtain porous nano-silicon 120.

In some embodiments, the silicon alloy includes but is not limited to at least one of aluminum-silicon alloy, iron-silicon alloy and silicon-zinc alloy. In some embodiments, the silicon alloy includes but is not limited to at least one of aluminum-silicon alloy, iron-silicon alloy, silicon-zinc alloy, magnesium-silicon alloy, aluminum-magnesium-silicon alloy, silicon-manganese alloy, copper-nickel-silicon alloy, or silicon-chromium alloy. In some embodiments, the silicon alloy is submicron particles.

In some embodiments, the etchant used for etching includes at least one of hydrochloric acid, hydrofluoric acid, sulfuric acid and phosphoric acid.

In some embodiments, the etchant used for etching includes but is not limited to at least one of hydrochloric acid, hydrofluoric acid, sulfuric acid, phosphoric acid, acetic acid, nitric acid, sulfurous acid, perchloric acid, hydrogen sulfuric acid, hypochlorous acid or benzoic acid.

In some embodiments, a time for the etching is 0 h-7 h and exclusive of 0, including but not limited to 0.1 h, 0.5 h, 1 h, 1.5 h, 2 h, 2.5 h, 3 h, 3.5 h, 4 h, 4.5 h, 5 h, 5.5 h, 6 h, 6.5 h or 7 h, etc. In some embodiments, the time for the etching is 0.5 h-5 h.

In some embodiments, porous nano-silicon 120 can also be commercially available.

In S120, performing a surface plating treatment on the porous nano-silicon 120 to obtain the porous nano-silicon 120 on a surface of which the magnesium silicide layer 122 is formed.

In some embodiments, the method of surface plating treatment includes at least one of magnetron sputtering or vacuum plating.

In some embodiments, the magnetron sputtering and the vacuum plating are performed in magnetron sputtering equipment and vacuum plating equipment, respectively.

In some embodiments, step S120 may be omitted, at this time the magnesium silicide layer 122 is not formed on the surface of the porous nano-silicon 120.

Step S200, Preparing a Silicon-Based Composite Material.

In step S200, mixing the porous nano-silicon 120 on a surface of which the magnesium silicide layer 122 is formed, the organic solvent, the dispersant and the graphite to obtain a slurry, and drying to obtain the silicon-based composite material 100.

In some embodiments, the organic solvent includes but is not limited to at least one of aromatic hydrocarbon, chlorinated hydrocarbon, alcohol ether, amine compound, ketone or alcohol. An example of the alcohol can be at least one of R—OH where R is C1-C11 alkyl. In some embodiments, the aromatic hydrocarbon includes, but not limited to, at least one of toluene, xylene, ethylbenzene, styrene, butyl toluene and vinyl toluene.

In some embodiments, the chlorinated hydrocarbon includes, but not limited to, at least one of perchloroethylene, dichloromethane, chloroform, carbon tetrachloride, trichloroethylene, tetrachloroethylene, trichloropropane, dichloroethane, chlorobenzene or dichlorobenzene.

In some embodiments, the alcohol ether includes, but not limited to, at least one of ethylene glycol ether, diethylene glycol monomethyl ether, propylene glycol monomethyl ether, dipropylene glycol dimethyl ether, ethylene glycol monoethyl ether or ethylene glycol monobutyl ether.

In some embodiments, the amine compound includes, but not limited to, at least one of triethanolamine, diethanolamine and butylamine.

In some embodiments, the alcohol includes, but not limited to, at least one of methanol, ethanol, propanol, isopropanol, butanol, isobutanol, pentanol, isoamyl alcohol, hexanol, isohexanol, heptanol, octanol, nonanol or heptanol.

In some embodiments, the ketone includes, but not limited to, at least one of acetone, methyl butanone, methyl isobutyl ketone, cyclohexanone or toluene cyclohexanone.

In some embodiments, the organic solvent includes at least one of methanol, ethanol, propanol, isopropanol, butanol, pentanol, acetone, toluene, styrene, perchloroethylene, trichloroethylene, ethylene glycol ether and triethanolamine.

The above embodiment provides a preparation method of porous nano-silicon 120-based composite material, the technical principle of which mainly lies: a silicon alloy is used as a raw material for etching to obtain the porous nano-silicon 120, and then the porous nano-silicon 120 enters the pores and/or interlayer of the graphite under the condition of an organic solvent to obtain a silicon-based composite material 100.

It should be noted that in the preparation method of the silicon-based composite material 100 provided in the above embodiments, a person skilled in the art can add a dispersant into the slurry. In the presence of the dispersant, the dispersant acts on the particle surface of the porous nano-silicon 120 to enhance the dispersion effect, which can obviously promote the porous nano-silicon 120 to enter the pore structure 142 of the graphite and form an embedded structure, so that it is more uniform and compact when the porous nano-silicon 120 bonds with the graphite, thereby effectively reducing the expansion rate of the silicon-based composite material 100.

In some embodiments, the dispersant includes, but not limited to, at least one of surfactants containing carboxyl, sulfonic acid group or amino group.

In some embodiments, the surfactant containing carboxyl group includes but not limited to, at least one of n-octadecanoic acid, n-eicosanoic acid, lauric acid, polyacrylic acid, stearic acid, oleic acid, linoleic acid, palmitic acid, sodium/potassium laurate, sodium/potassium myristate, sodium/potassium palmitate or sodium/potassium stearate.

In some embodiments, the surfactant containing amino group includes, but not limited to, at least one of polyvinylpyrrolidone, sodium glutamate, sodium glycinate, sodium/ammonium dodecyl polyoxyethylene ether sulfate, sodium ammonium dodecyl sulfate, cocoyl monoethanolamide or cocoyldiethanolamide.

In some embodiments, the surfactant containing sulfonic acid group includes, but not limited to, at least one of sodium dodecyl benzene sulfonate, sodium alkyl benzene sulfonate, α-olefin sulfonate, α-sulfomonocarboxylic acid or petroleum sulfonate. In some embodiments, the dispersant includes at least one of n-octadecanoic acid, epoxy resin, lauric acid, polyacrylic acid, sodium dodecyl benzene sulfonate, n-eicosanoic acid, polyvinyl chloride and polyvinylpyrrolidone.

It can be understood that by using the above dispersant, the functional groups such as carboxyl or amino contained on the surface of which can react with the Si—O groups on the surface of the porous nano-silicon 120, thereby promoting the porous nano-silicon 120 to enter the pores of the graphite to form an embedded structure, thereby reducing the expansion rate of the silicon-based composite material 100.

In some embodiments, the method of the drying includes, but not limited to, at least one of vacuum drying, spray drying or rotary evaporation.

In some embodiments, the mass ratio of porous nano-silicon 120 to the graphite is (0.5-80):(10-50), including but not limited to 1:45, 5:40, 10:35, 20:30, 40:25, 60:20, 70:15 or 80:50, etc.

S300: Carbon Coating

In some embodiments, the steps for carbon coating include: mixing the dried product with a carbon source, and sintering to obtain the silicon-based composite material 100 formed with the carbon coating 180.

In some embodiments, the carbon source includes at least one of saccharides, resins, organic acids, polymeric polyols, enols, or a mixture of graphitizable carbon materials.

In some embodiments, the saccharides include, but not limited to, at least one of sucrose, glucose, fructose or lactose.

In some embodiments, the resins include, but not limited to, at least one of epoxy resin, phenolic resin, polyvinyl chloride or polyester resin.

In some embodiments, the organic acids include, but not limited to, at least one of carboxyl, sulfonic acid, sulfinic acid or thiocarboxylic acid.

In some embodiments, the carboxylic acids, include but not limited to, at least one of formic acid, acetic acid, propionic acid, butyric acid or citric acid.

In some embodiments, the polymeric polyols and enols include, but not limited to, at least one of polyethylene glycol or polyvinyl alcohol.

In some embodiments, the mixture of graphitizable carbon materials includes, but not limited to, at least one of asphalt, petroleum coke or needle coke.

In some embodiments, the carbon source includes at least one of epoxy resin, citric acid, sucrose, glucose, asphalt, phenolic resin, fructose, polyethylene glycol, polyvinyl alcohol and polyvinyl chloride.

In some embodiments, the temperature of the sintering is 500° C.-1500° C., including but not limited to 600° C., 700° C., 800° C., 900° C., 1000° C., 1100° C., 1200° C., 1300° C. or 1400° C., etc. The time of the sintering can be 1 h-12 h, including but not limited to 2 h, 3 h, 4 h, 5 h, 6 h, 7 h, 8 h, 9 h, 10 h or 11 h, etc.

In some embodiments, the temperature of the sintering is 800° C.-1200° C., including but not limited to 850° C., 900° C., 950° C., 1000° C., 1050° C., 1100° C. or 1150° C. The time of the sintering can be 3 h-10 h, including but not limited to 4 h, 5 h, 6 h, 7 h, 8 h or 9 h, etc.

In some embodiments, after the sintering, the method further includes pulverizing, sieving and demagnetizing the sintered product to obtain the silicon-based composite material 100.

As shown in FIGS. 10 and 11, in some embodiments, step S300 is omitted, that is, the carbon coating 180 is not formed on the surface of the silicon-based composite material 100.

III. Anode Material and Anode

The silicon-based composite material 100 can be used as an anode active material, for example, in a lithium ion battery 200. An embodiment provides an anode material including the above-mentioned silicon-based composite material 100.

In some embodiments, the anode material further includes a binder.

In some embodiments, the anode material further includes a conductive agent. In some embodiments, the anode material includes the above-mentioned silicon-oxygen composite material, a binder and a conductive agent.

In some embodiments, the anode material further includes graphite. In some embodiments, the anode material includes the above-mentioned silicon-oxygen composite material, a binder, a conductive agent and graphite.

An embodiment provides a method for preparing an anode material, which includes mixing the above components. An embodiment provides a method for preparing an anode material, comprising: mixing silicon-based composite material 100, a conductive agent and a binder. An embodiment provides a method for preparing an anode material, which includes: mixing silicon-based composite material 100, a conductive agent, a binder and graphite.

An embodiment provides an anode 240 including a silicon-based composite material 100.

Figure 16:
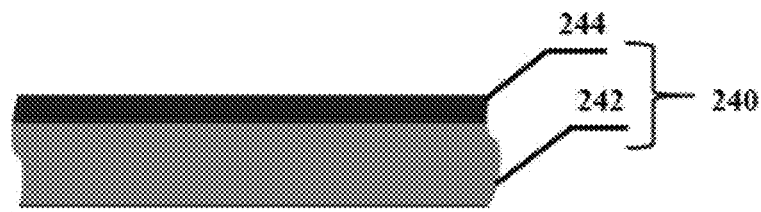
FIG. 16 is a structure schematic diagram of an anode of some embodiments of the present disclosure.

As shown in FIG. 16, in some embodiments, the anode includes an anode current collector 242 and an anode material layer 244 on the anode current collector 242, wherein the anode material layer 244 contains the above anode material.

An embodiment provides a method for preparing an anode 240, which includes coating a slurry including an anode material on an anode current collector 242.

In some embodiments, an anode is provided, which includes an anode current collector 242 and an anode active material layer 244 on the anode current collector 242, wherein the anode active material layer 244 includes the above-mentioned silicon-based composite material 100. In some embodiments, the anode active material layer 244 further contains a conductive agent and a binder. In some embodiments, the anode active material layer 244 further includes graphite.

In some embodiments, the mass ratio of the silicon-based composite material 100, the conductive agent and the binder is (93-98):(1.0-2.0):(1.0-5.0).

In some embodiments, a method for preparing the anode 240 is provided, which includes applying a slurry including a silicon-oxygen composite anode material to the anode current collector 242 to form an anode active material layer 244 on the anode current collector 242; and drying the anode active material layer 244.

In some embodiments, the drying may be vacuum drying. In some embodiments, the total solid content of the slurry is 30%-60%. In some embodiments, the total solid content of the silicon-based composite material 100, the conductive agent and the binder in the slurry is 30%-60%. In some embodiments, the total solid content of silicon-based composite material 100, the conductive agent, the binder and the graphite in the slurry is 30-60%.

In some embodiments, before the slurry is applied to the anode current collector (242), the following steps are included: dispersing each component in the anode active material layer 244 (such as the silicon-based composite material 100, the conductive agent and the binder, and optionally graphite) in a solvent to form a slurry.

In some embodiments, the anode current collector 242 may be metal. In some embodiments, the anode current collector 242 includes, but not limited to, one of a copper foil current collector or an aluminum foil current collector.

The slurry may contain a solvent. In some embodiments, the solvent includes, but not limited to, water.

Without being bound by theory, it is believed that the binder can improve the adhesion properties of the anode active material particles to each other and to the current collector 242. In some embodiments, the binder includes at least one of a non-aqueous binder or an aqueous binder. The non-aqueous binder includes, but not limited to, at least one of polyvinyl chloride, carboxylated polyvinyl chloride, polyvinyl fluoride, ethylene oxide-containing polymer, polyvinylpyrrolidone, polyurethane, polytetrafluoroethylene, polyvinylidene fluoride, polyethylene, polypropylene, polyamideimide, or polyimide. The aqueous binder includes, but not limited to, at least one of a rubber-based binder or a polymer resin binder.

The conductive agent can improve the conductivity of electrodes. The conductive agent includes, but not limited to, materials with high conductivity, such as gold, copper, nickel, aluminum, silver, and/or similar metal powder or metal fiber and/or similar metal-based materials; or natural graphite, artificial graphite, carbon black, acetylene black, ketjen black, carbon fiber and/or similar carbon-based materials; or polyphenylene derivatives and/or similar conductive polymers; and/or a mixture thereof.

IV. Lithium Ion Battery

An embodiment provides a lithium ion battery 200 including the silicon-based composite material 100.

The lithium ion battery 200 of some embodiments may include a cathode 220, an anode 240, and an electrolyte 260.

In some embodiments, the lithium ion battery 200 includes a cathode 220; an anode 240; and an electrolyte 260, wherein the anode 240 includes an anode current collector 242 and an anode active material layer 244 disposed on the anode current collector 242, and the anode active material layer 244 includes the silicon-oxygen composite material 100.

Figure 17:
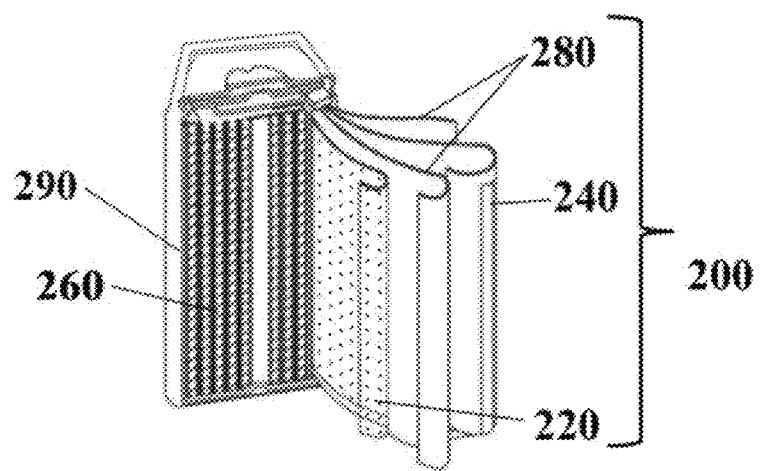
FIG. 17 is a schematic diagram of a battery of some embodiments of the present disclosure.

As shown in FIG. 17, in some embodiments, the lithium ion battery 200 may include a separator 280 disposed between the cathode 220 and the anode 240. The separator 280 may be a polymer microporous membrane, such as a polypropylene microporous membrane. The separator 280 may be commercially available.

In some embodiments, the lithium ion battery 200 may include a case 290. The cathode 220, the anode 240, the separator 280, and the electrolyte 260 can be accommodated in the case 290.

In some embodiments, the lithium ion battery can be a cylindrical battery, a square battery or a button cell. The lithium ion battery can be a rigid case battery or a flexible package battery.

In some embodiments, the cathode 220 may include a cathode current collector and a cathode active material layer disposed on the cathode current collector. The cathode active material layer includes a cathode active material capable of reversibly intercalating and deintercalating lithium ions, and examples of the cathode active material includes, but not limited to, one of $LiCoO_2$, $LiNiO_2$, $LiMnO_2$, $LiMn_2O_4$, $LiNi_{1-x-y}Co_xM_yO_2$ ($0 \leq x \leq 1$, $0 \leq y \leq 1$, $0 \leq x+y \leq 1$, and M is a metal such as Al, Sr, Mg or La), or lithium-transition metal oxide.

In some embodiments, the electrolyte 260 includes, but not limited to, a non-aqueous organic solvent, such as at least one of carbonate, ester, ether or ketone. In some embodiments, the carbonate includes, but not limited to, at least one of dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC) or butylene carbonate (BC). The ester includes, but not limited to, at least one of butyrolactone (BL), decanolactone, valerolactone (BL), mevalonolactone, caprolactone (BC), methyl acetate, ethyl acetate or n-propyl acetate. The ether includes, but not limited to, dibutyl ether. The ketone includes, but not limited to, polymethylvinyl ketone.

Advantages of the embodiments of the present disclosure will be set forth in part in the following description, part of which will be obvious from the description, or may be obtained by some examples of the embodiments of the present disclosure.

The lithium ion battery provided by the above embodiments has the advantages of high cycle capacity retention rate and low expansion rate of polar plates.

In order to better explain the disclosure and facilitate understanding of the technical solution of the disclosure, the disclosure is further described in detail below. Of course, the following examples are only simple examples of this disclosure, and do not represent or limit the protection scope of the rights of this disclosure, which shall be subject to the claims. It should be noted that the features in the embodiments of the present disclosure can be combined with each other without conflict.

EXAMPLES

Example 1

An Al—Si alloy with a median particle size of 20 μm was mixed with grinding balls and then put into a high-energy ball mill, wherein quenched steel balls of 3 mm were selected as the grinding balls, and a stainless steel tank of 5 L was used. Then argon protective gas was introduced, and a high-energy ball milling was performed, wherein the rotating speed of the ball mill was 500 r/min, and the mass ratio of the grinding balls to the powder was 100:1. After ball milling for 40 h, submicron sized Al—Si alloy particles with a median particle size (D50) of 0.5 μm were obtained. 1 mol/L of a hydrochloric acid solution was prepared and the submicron sized Al—Si alloy particles were added into, stirred for 5 h, and then centrifugally dried to obtain a porous nano-silicon (with a median particle size of 300 nm, a porosity of 51%, and a specific surface area of 229 $m^2/g$); flake graphite (the ratio of length:width:thickness was 20:3:0.2) was added into the porous nano-silicon, and an organic solvent methanol was added, wherein the ratio of the median particle size of the graphite to that of the porous nano-silicon was 10:1. A slurry was formed by stirring, wherein the mass ratio of the porous nano-silicon to the graphite was 100:40, and then dried to obtain a precursor. The obtained precursor and glucose were proportioned according to the mass ratio of 60:55 and mixed uniformly, and then placed in a VC mixer, wherein the frequency was adjusted to 30 Hz, and mixed for 60 min, then transferred to a blender, wherein the rotating speed was adjusted to 2000 rpm, and blended for 2 h. The blended product was transferred to a high-temperature box furnace, and nitrogen protective gas was introduced, and the temperature was raised to 850° C. for sintering for 5 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 25% and the mass fraction of the porous nano-silicon was 61%, based on 100% by mass of the silicon-based composite.

Figure 6:
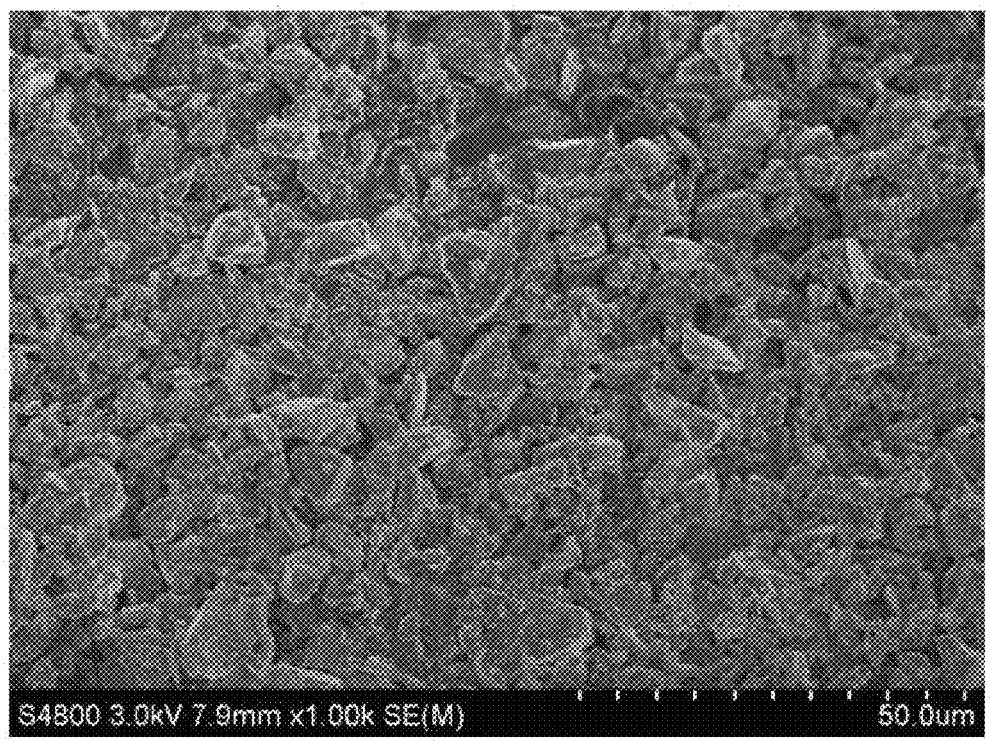
FIG. 6 is a scanning electron microscope image of the silicon-based composite material in Example 1 of the present disclosure.
Figure 7:
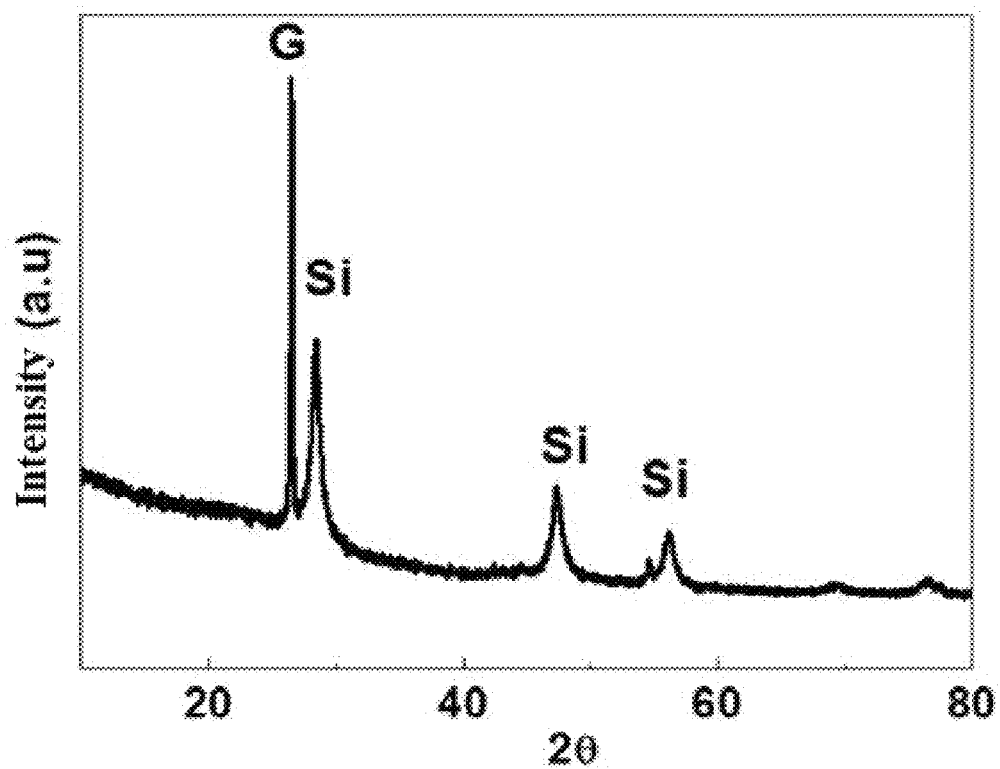
FIG. 7 is an X-ray diffraction pattern of the silicon-based composite material in Example 1 of the present disclosure, where G represents graphite and Si represents silicon.

The SEM image of the silicon-based composite material obtained by this example is shown in FIG. 6. The x-ray diffraction curve is shown in FIG. 7, from which the peak positions of silicon and graphite can be observed.

Example 2

An Al—Si alloy with a median particle size of 30 μm was mixed with grinding balls and then put into a planetary ball mill, wherein zirconium dioxide balls of 0.5 mm were selected as the grinding balls, and a stainless steel tank of 5 L was used. Then argon protective gas was introduced, and a high-energy ball milling was performed, wherein the rotating speed of the ball mill was 500 r/min, and the mass ratio of the grinding balls to the powder was 30:1. After ball milling for 30 h, submicron sized Al—Si alloy particles with a median particle size (D50) of 0.3 μm were obtained. 2 mol/L of a hydrochloric acid solution was prepared and the submicron sized Al—Si alloy particles were added, stirred for 4 h, and then centrifugally dried to obtain a porous nano-silicon (with a median particle size of 200 nm, a porosity of 66%, and a specific surface area of 300 m$^2$/g); flake graphite (the ratio of length:width:thickness was 5:2: 0.1) was added into the porous nano-silicon, and an organic solvent ethanol was added, wherein the ratio of the median particle size of the graphite to that of the porous nano-silicon was 40:1. A slurry was formed by stirring, wherein the mass ratio of the porous nano-silicon to the graphite was 100:50, and then dried to obtain a precursor. The obtained precursor and sucrose were proportioned according to the mass ratio of 60:30 and mixed uniformly, and then placed in a VC mixer, wherein the frequency was adjusted to 30 Hz, and mixed for 60 min, then transferred to a blender, wherein the rotating speed was adjusted to 1500 rpm, and blended for 3 h. The blended product was transferred to a high-temperature box furnace, and nitrogen protective gas was introduced, and the temperature was raised to 850° C. for sintering for 5 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 28% and the mass fraction of the porous nano-silicon was 57.9%, based on 100% by mass of the silicon-based composite.

Example 3

An Al—Si alloy with a median particle size of 50 μm was mixed with grinding balls and then put into a sand mill, wherein zirconium dioxide balls of 1 mm were selected as the grinding balls. A high-energy ball milling was performed, wherein the mass ratio of the grinding balls to the powder was 10:1. After ball milling for 10 h, submicron sized Al—Si alloy particles with a median particle size (D50) of 0.2 μm were obtained. 1 mol/L of a hydrochloric acid solution was prepared and the submicron sized Al—Si alloy particles were added into, stirred for 2 h, and then centrifugally dried to obtain a porous nano-silicon (with a median particle size of 150 nm, a porosity of 60%, and a specific surface area of 280 m$^2$/g); flake graphite (the ratio of length:width:thickness was 15:2:0.1) was added into the porous nano-silicon, and an organic solvent propanol was added, wherein the ratio of the median particle size of the graphite to that of the porous nano-silicon was 20:1. A slurry was formed by stirring, wherein the ratio of the porous nano-silicon to the graphite was 100:70, and then spray dried to obtain a precursor. The obtained precursor and polyvinyl chloride were proportioned according to the mass ratio of 100:60 and mixed uniformly, and then placed in a VC mixer, wherein the frequency was adjusted to 30 Hz, and mixed for 60 min, then transferred to a blender, wherein the rotating speed was adjusted to 1000 rpm and the blade gap was 0.1 cm, and blended for 3.5 h. The blended product was transferred to a high-temperature box furnace, and nitrogen protective gas was introduced, and the temperature was raised to 950° C. for sintering for 3 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 36% and the mass fraction of the porous nano-silicon was 51%, based on 100% by mass of the silicon-based composite.

Figure 2:
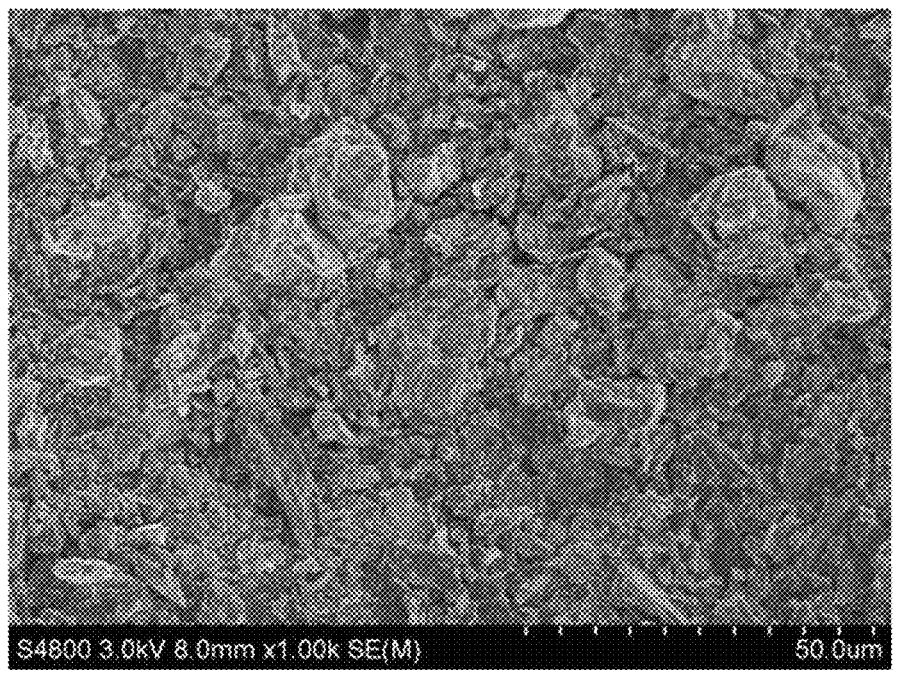
FIG. 2 is a scanning electron microscope image of the silicon-based composite material in Example 3 of the present disclosure.
Figure 3:
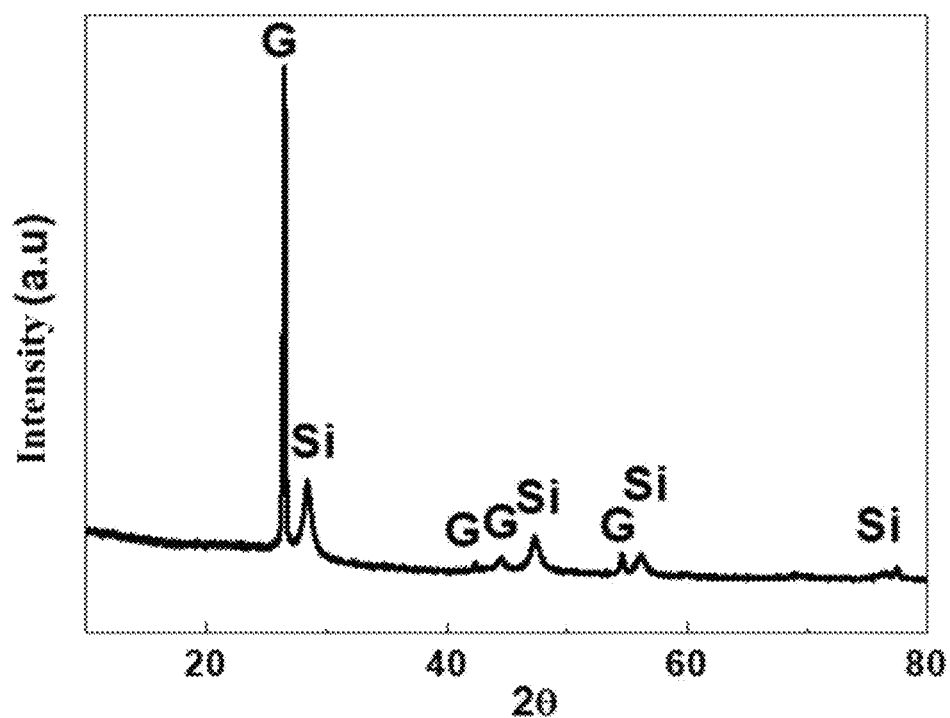
FIG. 3 is an X-ray diffraction pattern of the silicon-based composite material in Example 3 of the present disclosure, where G represents graphite and Si represents silicon.

The SEM image of the silicon-based composite material obtained in this example is shown in FIG. 2. The X-ray diffraction curve is shown in FIG. 3, from which the peak positions of silicon and graphite can be observed.

Example 4

An Zn—Si alloy with a median particle size of 50 μm was mixed with grinding balls and then put into a attritor, wherein zirconium dioxide balls of 1 mm were selected as the grinding balls. A high-energy ball milling was performed, wherein the mass ratio of the grinding balls to the powder was 15:1. After ball milling for 15 h, submicron sized Zn—Si alloy particles with a median particle size (D50) of 0.4 μm were obtained. 1 mol/L of a hydrochloric acid solution was prepared and the submicron sized Zn—Si alloy particles were added into, stirred for 6 h, and then centrifugally dried to obtain a porous nano-silicon (with a median particle size of 250 nm, a porosity of 70%, and a specific surface area of 250 m$^2$/g); flake graphite (the ratio of length:width:thickness was 2:0.4:0.15) was added into the porous nano-silicon, and an organic solvent toluene was added, wherein the ratio of the median particle size of the graphite to that of the porous nano-silicon was 15:1. A slurry was formed by stirring, wherein the mass ratio of the porous nano-silicon to the graphite was 80:100, and then spray dried to obtain a precursor. The obtained precursor and phenolic resin were proportioned according to the mass ratio of 50:50 and mixed uniformly, and then placed in a VC mixer, wherein the frequency was adjusted to 30 Hz, and mixed for 40 min, then transferred to a blender, wherein the rotating speed was adjusted to 1600 rpm and the blade gap was 0.1 cm, and blended for 2.5 h. The blended product was transferred to a high-temperature box furnace, and nitrogen protective gas was introduced, and the temperature was raised to 950° C. for sintering for 5 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 39% and the mass fraction of the porous nano-silicon was 32%, based on 100% by mass of the silicon-based composite.

Example 5

An Al—Si alloy with a median particle size of 20 μm was mixed with grinding balls and then put into a high-energy ball mill, wherein quenched steel balls of 3 mm were selected as the grinding balls, and a stainless steel tank of 5 L was used. Then argon protective gas was introduced, and a high-energy ball milling was performed, wherein the rotating speed of the ball mill was 500 r/min, and the mass ratio of the grinding balls to the powder was 100:1. After ball milling for 40 h, submicron sized Al—Si alloy particles with a median particle size (D50) of 0.5 μm were obtained. 2 mol/L of a hydrochloric acid solution was prepared and the submicron sized Al—Si alloy particles were added into, stirred for 5 h, and then centrifugally dried to obtain a porous nano-silicon (with a median particle size of 300 nm, a porosity of 51%, and a specific surface area of 229 m$^2$/g); flake graphite (the ratio of length:width:thickness was 5:0.4: 0.1) was added into the porous nano-silicon, and an organic solvent acetone was added, wherein the ratio of the median particle size of the graphite to that of the porous nano-silicon was 30:1. A slurry was formed by stirring, wherein the mass ratio of the porous nano-silicon to the graphite was 80:50, and then spray dried to obtain a precursor. The obtained precursor and polyacrylic acid were proportioned according to the mass ratio of 90:45 and mixed uniformly, and then placed in a VC mixer, wherein the frequency was adjusted to 30 Hz, and mixed for 60 min, then transferred to a blender, wherein the rotating speed was adjusted to 2000 rpm and the blade gap was 0.1 cm, blended for 2 h. The blended product was transferred to a high-temperature box furnace, and nitrogen protective gas was introduced, and the temperature was raised to 1500° C. for sintering for 1 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 35% and the mass fraction of the porous nano-silicon was 56%, based on 100% by mass of the silicon-based composite.

Example 6

An Al—Si alloy with a median particle size of 20 μm was mixed with grinding balls and then put into a high-energy ball mill, wherein quenched steel balls of 3 mm were selected as the grinding balls, and a stainless steel tank of 5 L was used. Then argon protective gas was introduced, and a high-energy ball milling was performed, wherein the rotating speed of the ball mill was 500 r/min, and the mass ratio of the grinding balls to the powder was 100:1. After ball milling for 40 h, submicron sized Al—Si alloy particles with a median particle size (D50) of 0.5 μm were obtained. 1 mol/L of a hydrochloric acid solution was prepared and the submicron sized Al—Si alloy particles were added into, stirred for 5 h, and then centrifugally dried to obtain a porous nano-silicon (with a median particle size of 300 nm, a porosity of 51%, and a specific surface area of 229 m$^2$/g); flake graphite (the ratio of length:width:thickness was 10:1: 0.1) was added into the porous nano-silicon, and an organic solvent triethanolamine was added, wherein the ratio of the median particle size of the graphite to that of the porous nano-silicon was 40:1. A slurry was formed by stirring, wherein the mass ratio of the porous nano-silicon to the graphite was 85:100, and then spray dried to obtain a precursor. The obtained precursor and phenolic resin were proportioned according to the mass ratio of 110:100 and mixed uniformly, and then placed in a VC mixer, wherein the frequency was adjusted to 30 Hz, and mixed for 60 min, then transferred to a blender, wherein the rotating speed was adjusted to 2000 rpm and the blade gap was 0.1 cm, and blended for 2 h. The blended product was transferred to a high-temperature box furnace, and nitrogen protective gas was introduced, and the temperature was raised to 500° C. for sintering for 12 h, then, the product was cooled to room temperature, and crushed, sieved, and demagnetized to obtain the silicon-based composite material.

The silicon-based composite material obtained by this example included porous nano-silicon, flake graphite, and a carbon coating on the outer surface, and the porous nano-silicon was embedded in the interlayer of the flake graphite. The mass fraction of the flake graphite was 44% and the mass fraction of the porous nano-silicon was 37%, based on 100% by mass of the silicon-based composite.

Example 7

The parameters and conditions were the same as those in Example 1 except that n-octadecanoic acid was added in the process of mixing the porous nano-silicon, the graphite and the organic solvent.

The silicon-based composite material obtained by this example included porous nano-silicon, flake graphite, and a carbon coating on the outer surface, and the porous nano-silicon was embedded in the interlayer of flake graphite. The mass fractions of the flake graphite was 24.5% and the mass fraction of the porous nano-silicon was 60.1%, based on 100% by mass of the silicon-based composite.

Example 8

The parameters and conditions were the same as those in Example 1 except that sodium dodecyl benzene sulfonate was added in the process of mixing the porous nano-silicon, the graphite and the organic solvent.

The silicon-based composite material obtained by this example included porous nano-silicon, flake graphite, and a carbon coating on the outer surface, and the porous nano-silicon was embedded in the interlayer of flake graphite. The mass fractions of the flake graphite was 25.2% and the mass fraction of the porous nano-silicon was 61%, based on 100% by mass of the silicon-based composite.

Example 9

The parameters and conditions were the same as those in Example 1 except that the conditions of ball milling and etching by hydrochloric acid were adjusted so that the median particle size of the obtained porous nano-silicon was 240 nm, the porosity was 59%, and the specific surface area was 230 m$^2$/g.

The silicon-based composite material obtained by this example included porous nano-silicon, flake graphite, and a carbon coating on the outer surface, and the porous nano-silicon was embedded in the interlayer of flake graphite. The mass fractions of the flake graphite was 25% and the mass fraction of the porous nano-silicon was 60%, based on 100% by mass of the silicon-based composite.

Example 10

The parameters and conditions were the same as those in Example 1 except that the conditions of ball milling and etching by hydrochloric acid were adjusted so that the median particle size of the obtained porous nano-silicon was 190 nm, the porosity was 63%, and the specific surface area was 280 m$^2$/g.

The silicon-based composite material obtained by this example included porous nano-silicon, flake graphite, and a carbon coating on the outer surface, and the porous nano-silicon was embedded in the interlayer of flake graphite. The mass fractions of the flake graphite was 25% and the mass fraction of the porous nano-silicon was 61.1%, based on 100% by mass of the silicon-based composite.

Example 11

The parameters and conditions were the same as those in Example 1 except that the graphite used was adjusted to be porous graphite, the pore diameter in the graphite was 10% larger than the particle size of the porous nano-silicon, and the porosity was 50%.

The silicon-based composite material obtained by this example included porous nano-silicon, porous graphite, and a carbon coating on the outer surface, and the porous nano-silicon was embedded in the pores of porous graphite. The mass fractions of the porous graphite was 24.1% and the mass fraction of the porous nano-silicon was 60.9%, based on 100% by mass of the silicon-based composite.

Example 12

The parameters and conditions were the same as those in Example 1 except that the graphite used was adjusted to be porous graphite, the pore diameter in the graphite was 50% larger than the particle size of the porous nano-silicon, and the porosity was 10%.

The silicon-based composite material obtained by this example included porous nano-silicon, porous graphite, and a carbon coating on the outer surface, and the porous nano-silicon was embedded in the pores of porous graphite. The mass fractions of the porous graphite was 24% and the mass fraction of the porous nano-silicon was 59.8%, based on 100% by mass of the silicon-based composite.

Example 13

The method and conditions were the same as those in Example 1 except that the porous nano-silicon was performed surface plating treatment, so as to form a magnesium silicide layer with a thickness of 5 nm thereon, before mixing the porous nano-silicon, the graphite and the organic solvent.

The silicon-based composite material obtained by this example included porous nano-silicon, flake graphite, and a carbon coating on the outer surface, wherein a magnesium silicide layer was formed on the surface of the porous nano-silicon, and the porous nano-silicon was embedded in the interlayer of the flake graphite. The mass fractions of the flake graphite was 25%, the mass fraction of the porous nano-silicon was 58%, and the mass fraction of the magnesium silicide was 1.5%, based on 100% by mass of the silicon-based composite.

Comparative Example 1

The method and conditions were the same as those in Example 1 except that the porous nano-silicon was replaced by a nano-silicon with an equal particle size.

Comparative Example 2

The parameters and conditions were the same as those in Example 1 except that a carbon coating was performed directly by proportioning the porous nano-silicon as a precursor to a phenolic resin according to a mass ratio of 60:30.

Comparative Example 3

The parameters and conditions were the same as those in Example 1 except that a carbon coating was performed directly by proportioning the porous nano-silicon 120 as a precursor to glucose according to a mass ratio of 60:55.

Performance Tests:

I. X-Ray Diffraction Measurement of Samples

X-ray diffractometer: manufacturer: PANalytical B.V., Netherlands, model: X'pert PRO;

The setting parameters of the X-ray diffractometer are: divergence slit D.S.: 1.0°, scanning range: 10°-90°; anti-scatter slit S.S.:1.0°, scan step: 0.02°; receiving slit: 0.4 S.S./mm, scanning mode: step scanning, voltage: 40 kV, integration time of each step: 2 s; current: 40 mA; and scanning time: 2 h, 13 minutes and 20 seconds;

X-ray diffraction measurement was carried out on the silicon-based composite material prepared by the present disclosure by using the above instrument and parameters.

II. Specific Surface Area Test

Specific surface area ($m^2$/g): "Silicon Carbon" GB/T 38823-2020;

III. Fabrication of a Lithium Ion Battery

As shown in the schematic diagrams of anodes and batteries in FIGS. 16 and 17, the silicon-based composite materials 100 obtained by the above examples 1-13 and comparative examples 1-3, and a conductive agent (super P) and a binder (styrene butadiene rubber:sodium carboxymethyl cellulose=1:1 (mass ratio)) were mixed in the solvent water according to the mass ratio of 94:1:5, with the solid content being controlled at 50%, and coated on a copper foil current collector 242, and vacuum dried. The dried polar plates were punched into a circle with a diameter of 16 mm to prepare an anode 240 plate, and an anode active material layer 244 was formed on top of the anode 240 plate; then assembled with a ternary cathode 220 plate prepared by the traditional mature process, a 1 mol/L of electrolyte 260 ($LiPF_6$/EC (ethyl carbonate):DMC (dimethyl carbonate): EMC (methyl ethyl carbonate)=1:1:1 (volume ratio)), a Celgard 2400 separator 280, and a case 290 (18650 cylindrical single cells were assembled by the conventional production process) in a glove box filled with argon to obtain batteries.

Wherein, the ternary cathode 220 plate was prepared as follows: the cathode (NCM523), a conductive agent (SP: KS-6) and a binder (solef 5130-PVDF) were dissolved in NMP in a mass ratio of NCM:solef 5130-PVDF:SP:KS-6=96.8:1.2:1.0:1.0, with the solid content being controlled at 50%, and then coated on an Al foil current collector and dried under vacuum to obtain a cathode plate.

IV. Electrochemical Cycle Performance Test:
 (1) the initial reversible specific capacity (mAh/g): (i.e., the initial discharge specific capacity, $Q_{1(dis)}$), which is measured by the LAND Battery Testing System of Wuhan Kingnuo Electronics Co., Ltd.;
 (2) Initial coulombic efficiency (%):

The initial coulombic efficiency $E1 = Q_{1(dis)}/Q_{1(cha)} \times 100\%$ (Formula 1)

$Q_{1(dis)}$: the initial discharge specific capacity when charging and discharging at 0.1 C, (mAh/g);
$C_{1(dis)}$: the initial discharge capacity when charging and discharging at 0.1 C, (mAh);

$Q_{1(cha)}$: the initial charge specific capacity when charging and discharging at 0.1 C, (mAh/g);

$C_{1(cha)}$: the initial charge capacity when charging and discharging at 0.1 C, (mAh);

m: mass of the active substance, (g);

(Refer to Formula D.3 of "Silicon Carbon" GB/T 38823-2020);

(3) Capacity retention rate of 150 cycles (%):

Capacity retention rate of 150 cycles (%)=the $150^{th}$ discharge specific capacity/the initial discharge specific capacity×100%  (Formula 2).

The battery charge and discharge test was carried out in LAND Battery Test System (CT2001A) of Wuhan Kingnuo Electronics Co., Ltd., wherein the charge and discharge was carried out at a constant current of 0.2 C and the voltage was limited to 2.75-4.2V at a normal temperature. The charge specific capacity, discharge specific capacity, discharge capacity and coulombic efficiency were measured.

(4) 150-cycle polar plate expansion rate (%):

150-cycle polar plate expansion rate (%) $t=(D2-D1)/D1\times100\%$  (Formula 3).

A micrometer was used to measure the polar plates punched into circle, and their thickness were measured, and recorded as D1 in microns. Then the polar plates were assembled into a battery, and put on the LAND Battery Test System (CT3001K) of Wuhan Kingnuo Electronics Co., Ltd., charged and discharged at a constant current of 0.2 C at normal temperature, and the charging and discharging voltage was limited to 0.005V-1.5V. Completion of one charge and one discharge was recorded as one cycle. The batteries were disassembled in the glove box after 150 cycles, the anode 240 plated were taken out, and the thickness of these plates were measured with the micrometer, and recorded as D2 in microns. The expansion ratio t of the polar plates were calculated according to Formula 3, and the expansion ratio parameters were obtained.

V. The Test Results

FIG. 3 and FIG. 7 are the X-ray diffraction patterns of the silicon-based composite materials in Example 3 and Example 1 of the present disclosure, respectively.

Figure 4:
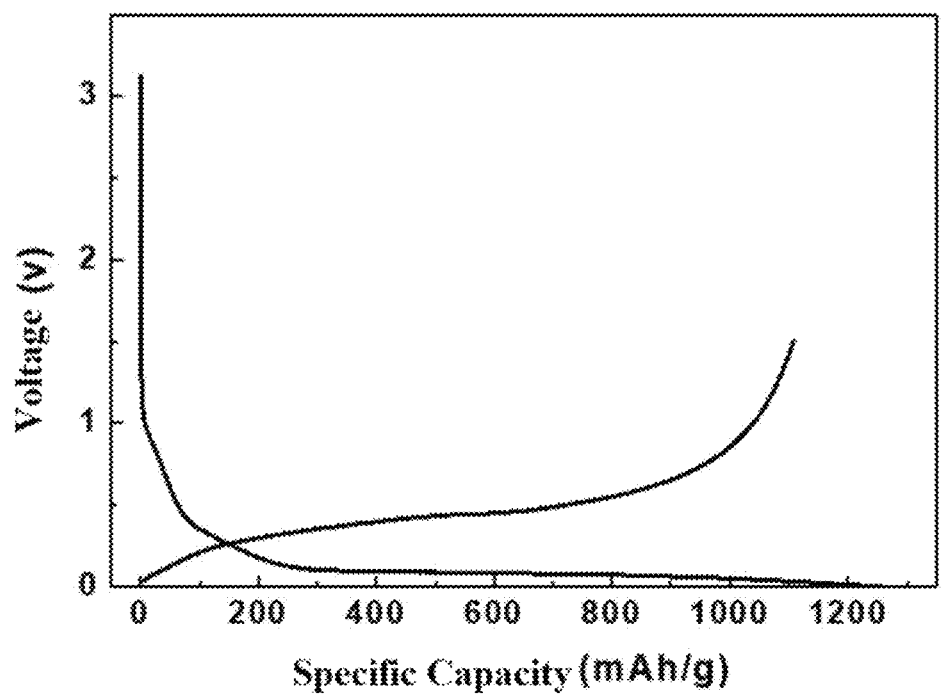
FIG. 4 is the initial charge-discharge curve of the silicon-based composite material in Example 3 of the present disclosure.
Figure 5:
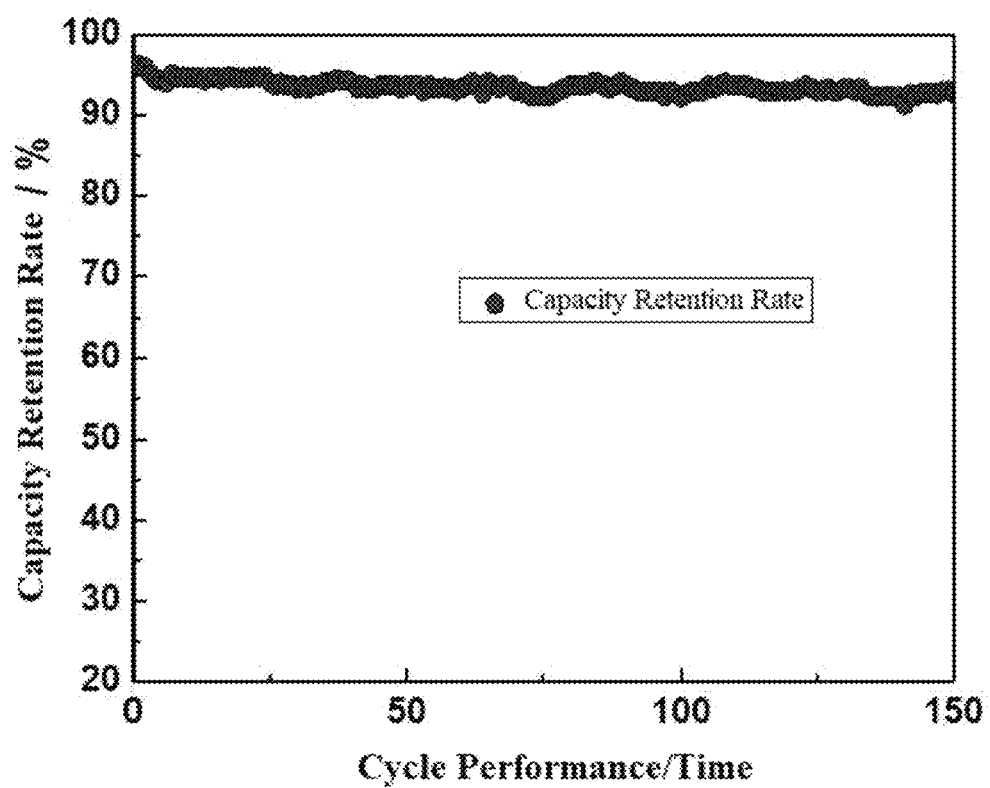
FIG. 5 is a cyclic performance curve of the silicon-based composite material in Example 3 of the present disclosure.
Figure 8:
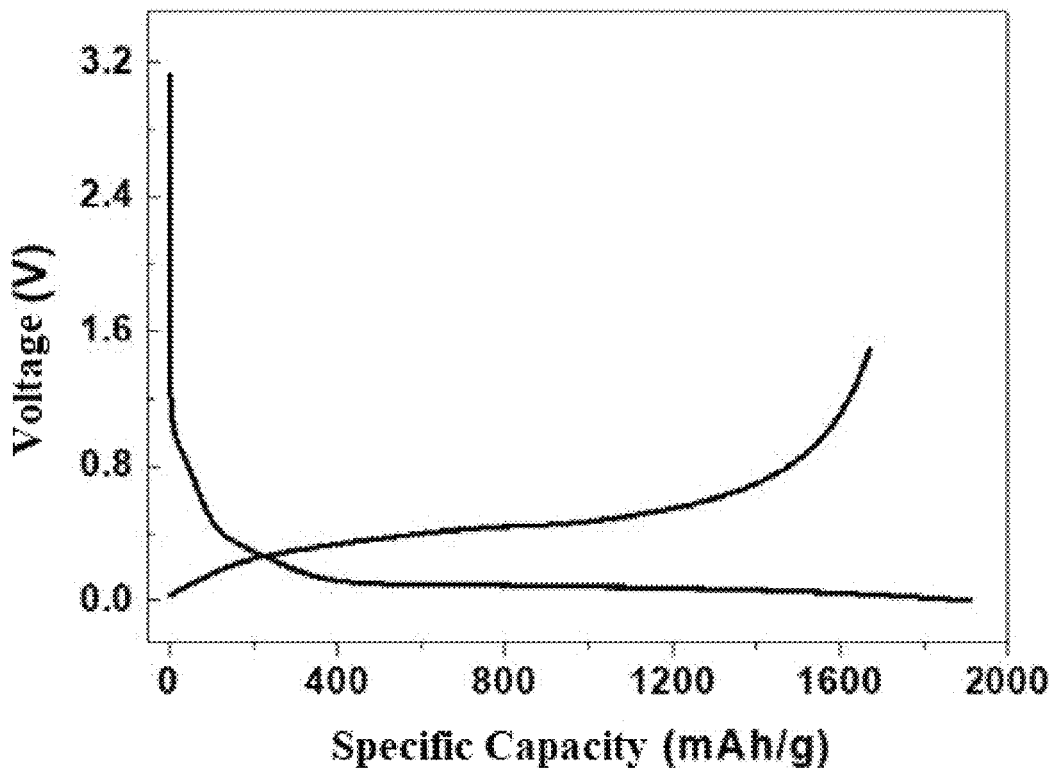
FIG. 8 is the initial charge-discharge curve of the silicon-based composite material in Example 1 of the present disclosure.
Figure 9:
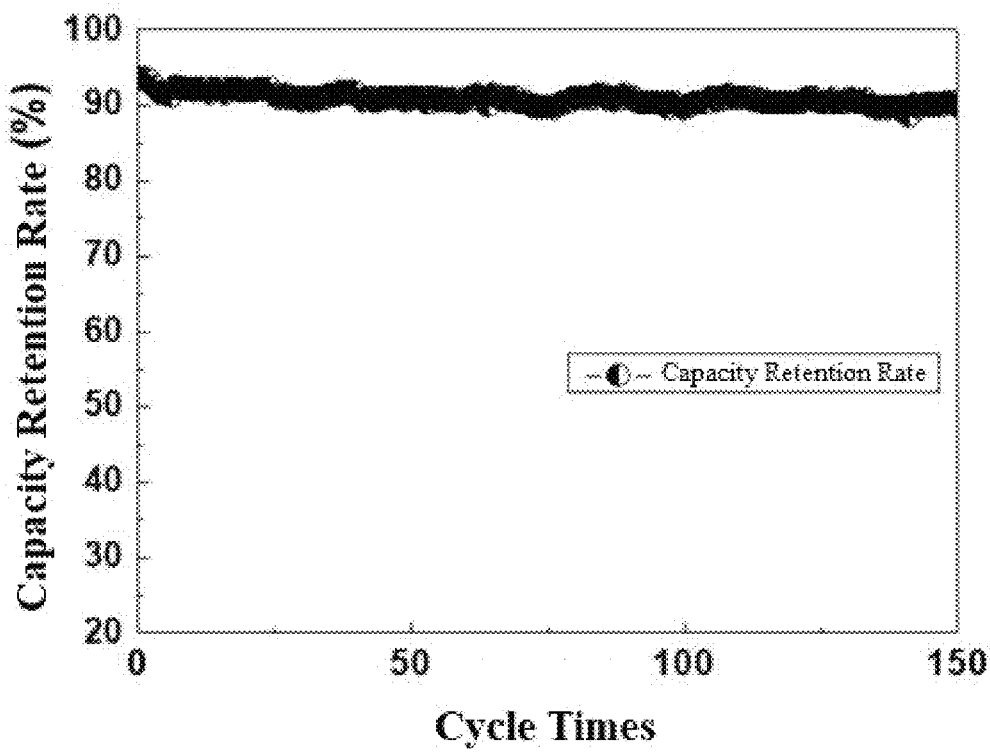
FIG. 9 is a cyclic performance curve of the silicon-based composite material in Example 1 of the present disclosure.

FIG. 4 and FIG. 8 are the initial charge-discharge curves of Example 3 and Example 1, respectively. It can be seen from FIG. 4 and FIG. 8 that the initial charge-discharge capacities of the silicon-based composite materials described in Examples 3 and 1 are higher, and the initial coulombic efficiencies are also higher. FIG. 5 and FIG. 9 correspond to the cycle performance test curves of Example 3 and Example 1, respectively. It can be seen from FIG. 5 and FIG. 9 that the silicon-based composite materials described in Examples 3 and 1 have excellent cycle performance, and the capacity retention rates are 92.5% and 90.1% respectively after 150 cycles. It should be noted that other Examples 2, and 4-13 also achieved similar technical effects to Example 3 in terms of the initial charge and discharge capacity, the initial coulombic efficiency and the cycle performance.

TABLE 1

| | Specific surface area (m²/g) | Initial reversible specific capacity (mAh/g) | Initial coulombic efficiency (%) | Capacity retention rate of 150 cycles (%) | 150-cycle polar plate expansion rate (%) |
|---|---|---|---|---|---|
| Example 1 | 4.9 | 1670.0 | 87.1 | 90.1 | 51.1 |
| Example 2 | 4.3 | 1480.3 | 87.5 | 91.8 | 48.5 |
| Example 3 | 5.3 | 1342 | 88.3 | 92.5 | 45.1 |
| Example 4 | 4.6 | 932.1 | 89.1 | 93.5 | 44.0 |
| Example 5 | 3.5 | 1402 | 87.9 | 90.5 | 46.5 |
| Example 6 | 4.1 | 1105 | 88.9 | 93.1 | 45.5 |
| Example 7 | 4.6 | 1628 | 87.3 | 91.9 | 49.1 |
| Example 8 | 5.0 | 1654 | 87.9 | 92.0 | 48.5 |
| Example 9 | 4.2 | 1635 | 88.3 | 92.5 | 47.2 |
| Example 10 | 3.9 | 1604 | 88.5 | 92.7 | 47.0 |
| Example 11. | 4.4 | 1679 | 88.6 | 92.9 | 49.0 |
| Example 12 | 4.7 | 1659 | 88.9 | 92.0 | 48.7 |
| Example 13 | 4.0 | 1601 | 89.8 | 93.9 | 46.7 |
| Comparative example 1 | 5.1 | 1302 | 87.3 | 87.9 | 61.2 |
| Comparative example 2 | 5.9 | 1921 | 85.9 | 85.5 | 65.9 |
| Comparative example 3 | 6.1 | 1702.3 | 84.9 | 83.8 | 66.1 |

It can be seen from Table 1 above that the silicon-based composite material of the present disclosure has excellent cycle performance and low expansion rate. By comparing Example 1 and Example 7-8 of the present disclosure, it can be seen that during the preparation process of the silicon-based composite material 100 of the present disclosure, a dispersant is added, the dispersant acts on the surface of the porous nano-silicon particles to enhance the dispersion effect, which can promote the porous nano-silicon to enter the interlayer and/or pore structure of the graphite to form an embedded structure, and when bonded with graphite, it is more uniform and compact, thereby reducing the expansion rate of the silicon-based composite material and optimizing the cycle performance. By comparing Example 1 and Examples 11-12 of the present disclosure, it can be seen that when the porous graphite is used, the silicon-based composite material has a lower expansion rate and a better cycle retention rate. By comparing Example 1 and Example 13 of the present application, it can be seen that when the surface of the porous nano-silicon contains a magnesium silicide layer 122, the silicon-based composite material has a lower expansion rate and a better cycle retention rate.

By comparing Example 1 with Comparative Example 1, it can be seen that using porous nano-silicon 120 in Example 1 can avoid the expansion of the material under the same conditions, improve the expansion performance of the material, and thus improve the cycle performance of the electrode material. The expansion of the material is greater and the cycle performance is worse under the same conditions as using an ordinary nano-silicon particles.

By comparing Example 1 with Comparative Example 2, it can be seen that in Example 1, because the flake graphite is used as a second phase material, compared with the embedded structure formed by a two-dimensional material and silicon, the carbon coating formed on its surface is more dense, which is beneficial to avoid the contact between the electrolyte and silicon, and improve the interface stability. The prepared material forms an embedded structure, which improves the cycle and expansion properties of the silicon-carbon product. Without using flake graphite 160 or porous graphite 140 as the second phase material, the prepared material cannot form an embedded structure, and the cycle and expansion properties of the obtained silicon-carbon product are poor.

By comparing Example 1 with Comparative Example 3, it can be seen that under the condition that the proportions of glucose are similar based on the added amount, Comparative Example 3 also does not use flake graphite 160 or porous graphite 140 as the second phase material, and thus the prepared material also cannot form an embedded structure, so that the initial coulombic efficiency and cycle capacity retention rate are significantly lower than those of Example 1, and its cycle and expansion properties are significantly worse than those of the silicon-based composite material prepared in Example 1.

The applicant declares that the specific methods of this disclosure is illustrated by the above embodiments, but this disclosure is not limited to the above specific methods, i.e., it does not necessarily mean that this disclosure must rely on the above specific methods to be implemented. It should be clear to those skilled in the art that any improvement to this disclosure, equivalent replacement of the raw materials, addition of auxiliary components, selection of specific methods, etc., fall within the scope of protection and disclosure of this disclosure.

INDUSTRIAL PRACTICABILITY

To sum up, the present disclosure provides a porous nano-silicon-based composite material, an anode, a lithium ion battery and preparation methods thereof. The porous nano-silicon-based composite material has ultra-low expansion features, and can improve the excellent cycle performance of lithium ion batteries.

What is claimed is:

1. A silicon-based composite material, comprising nano active particles and graphite, wherein the nano active particles comprise porous nano-silicon and a magnesium silicide layer formed on surface of the porous nano-silicon; a median particle size of the silicon-based composite material is 1 μm-40 μm; and one of
   the graphite has a pore structure in which the nano active particles are embedded, or
   the graphite has a layered structure in which the nano active particles are embedded.

2. The silicon-based composite material according to claim 1, wherein the silicon-based composite material comprises at least one of the following features (1) to (3):
   (1) a mass ratio of the nano active particles to the graphite is (0.5-80):(10-50);
   (2) a specific surface area of the silicon-based composite material is 1 m$^2$/g-20 m$^2$/g; and
   (3) a carbon coating is formed on a surface of the silicon-based composite material.

3. The silicon-based composite material according to claim 1, wherein the silicon-based composite material comprises at least one of the following features (1) to (4):
   (1) a median particle size of the porous nano-silicon is 1 nm-500 nm;
   (2) a specific surface area of the porous nano-silicon is 1 m$^2$/g-500 m$^2$/g;
   (3) a porosity of the porous nano-silicon is 20%-90%; and
   (4) a pore diameter of the porous nano-silicon is 1 nm-0.1 μm.

4. The silicon-based composite material according to claim 1, wherein the silicon-based composite material comprises at least one of the following features (1) and (2):
   (1) a thickness of the magnesium silicide layer is 1 nm-100 nm; and
   (2) a mass fraction of the magnesium silicide layer is 0.5%-10% based on 100% by mass of the nano active particles.

5. The silicon-based composite material according to claim 1, wherein the graphite comprises at least one of porous graphite and flake graphite, and the silicon-based composite material comprises at least one of the following features (1) to (6):
   (1) a median particle size of the graphite is 1 μm-10 μm;
   (2) a ratio of the median particle size of the graphite to that of the porous nano-silicon is (10-40):1;
   (3) a porosity of the porous graphite is 10%-50%;
   (4) a pore diameter of the porous graphite is 10%-50% larger than the median particle size of the porous nano-silicon;
   (5) a layer-to-layer spacing of the flake graphite is 10 nm-500 nm; and
   (6) a ratio of length: width: thickness of the flake graphite is (2-20):(0.4-3):(0.1-0.2).

6. A method for preparing a silicon-based composite material, comprising:
   mixing nano active particles and graphite in an organic solvent so that the nano active particles are embedded in the interlayers or pores of the graphite to obtain a slurry, and drying the slurry to obtain the silicon-based composite material, wherein the nano active particles comprise porous nano-silicon, wherein a preparation method of the porous nano-silicon comprises: etching a silicon alloy to obtain the porous nano-silicon, and wherein the preparation method of the porous nano-silicon further comprises: forming a magnesium silicide layer on a surface of the porous nano-silicon.

7. The method according to claim 6, wherein the method comprises at least one of the following features (1) to (5):
   (1) the silicon alloy comprises at least one of aluminum-silicon alloy, iron-silicon alloy and silicon-zinc alloy;
   (2) the silicon alloy is submicron particles;
   (3) an etchant used for the etching comprises at least one of hydrochloric acid, hydrofluoric acid, sulfuric acid or phosphoric acid;
   (4) a time for the etching is 0 h-7 h and exclusive of 0; and
   (5) a mass ratio of the porous nano-silicon to the graphite is (0.5-80):(10-50).

8. The method according to claim 6, wherein the organic solvent comprises at least one of aromatic hydrocarbon, chlorinated hydrocarbon, alcohol ether, amine compound, ketone or alcohol.

9. The method according to claim 6, wherein the method for preparing the silicon-based composite material further comprises: performing carbon coating on a product obtained by drying the slurry, wherein
   a method of the carbon coating comprises: mixing the product obtained by drying the slurry with a carbon source, and sintering to obtain the silicon-based composite material, wherein
   the carbon source comprises at least one of saccharides, resins, organic acids, polymeric polyols, enols, or a mixture of graphitizable carbon materials.

10. The method according to claim 6, wherein the method comprises at least one of the following features (1) to (3):
    (1) the organic solvent comprises at least one of methanol, ethanol, propanol, isopropanol, butanol, pentanol, acetone, toluene, styrene, perchloroethylene, trichloroethylene, ethylene glycol ether or triethanolamine;
    (2) a method for preparing the slurry further comprises: mixing the nano active particles, a dispersant and the graphite in the organic solvent to obtain a slurry, wherein the dispersant comprises at least one surfactant containing carboxyl, sulfonic acid group or amino group; and (3) a method for the drying comprises at least one of vacuum drying, spray drying or rotary evaporation.

11. The method according to claim 6, wherein
a preparation method for forming the magnesium silicide layer comprises: performing a surface plating treatment on the porous nano-silicon to obtain the porous nano-silicon on a surface of which the magnesium silicide layer is formed, wherein
a method for the surface plating treatment comprises at least one of magnetron sputtering and vacuum plating.

12. The method according to claim 6, comprising:
etching the silicon alloy to obtain the porous nano-silicon, wherein the silicon alloy is submicron particles;
performing surface plating treatment on the porous nano-silicon to obtain the porous nano-silicon on a surface of which a magnesium silicide layer is formed;
mixing the porous nano-silicon on a surface of which the magnesium silicide layer is formed, the organic solvent, a dispersant and the graphite to obtain a slurry, and drying to obtain a precursor, wherein the mass ratio of the porous nano-silicon to the graphite is (0.5-80):(10-50); and
mixing the precursor with a carbon source and sintering to obtain the silicon-based composite material.

13. A lithium ion battery, comprising the silicon-based composite material according to claim 1.

14. The method according to claim 8, wherein the alcohol is at least one of R—OH where R is C1-C11 alkyl.

15. The method according to claim 9, wherein the carbon source comprises at least one of epoxy resin, citric acid, sucrose, glucose, asphalt, phenolic resin, fructose, polyethylene glycol, polyvinyl alcohol or polyvinyl chloride.

16. The method according to claim 9, wherein a temperature for the sintering is 500° C.-1500° C. and a time for the sintering is 1 h-12 h.

17. The method according to claim 16, wherein the temperature for the sintering is 800° C.-1200° C. and the time for the sintering is 3 h-10 h.

18. The method according to claim 9, wherein after the sintering, the method further comprises pulverizing, sieving and demagnetizing a product obtained by sintering to obtain the silicon-based composite material.

19. The method according to claim 10, wherein the dispersant comprises at least one of n-octadecanoic acid, epoxy resin, lauric acid, polyacrylic acid, sodium dodecyl benzene sulfonate, n-eicosanoic acid, polyvinyl chloride or polyvinylpyrrolidone.

* * * * *